US012599277B2

(12) United States Patent
Vozhdayev

(10) Patent No.: US 12,599,277 B2
(45) Date of Patent: Apr. 14, 2026

(54) MULTI-FUNCTIONAL AUTOMATED ROBOTIC SYSTEM FOR AQUACULTURE

(71) Applicant: Pure Biomass Inc., Minneapolis, MN (US)

(72) Inventor: George Vozhdayev, Encinitas, CA (US)

(73) Assignee: Pure Biomass Inc., Encinitas, CA (US)

( * ) Notice: Subject to any disclaimer, the term of this patent is extended or adjusted under 35 U.S.C. 154(b) by 0 days.

(21) Appl. No.: 18/215,699

(22) Filed: Jun. 28, 2023

(65) Prior Publication Data

US 2024/0023777 A1 Jan. 25, 2024

Related U.S. Application Data

(60) Provisional application No. 63/356,481, filed on Jun. 28, 2022.

(51) Int. Cl.
| | |
|---|---|
| *A47L 9/00* | (2006.01) |
| *A01D 44/00* | (2006.01) |
| *A01G 33/00* | (2006.01) |
| *A47L 9/02* | (2006.01) |
| *A47L 9/24* | (2006.01) |
| *A47L 9/28* | (2006.01) |
| *G05D 1/00* | (2006.01) |
| *B62D 55/12* | (2006.01) |

(52) U.S. Cl.
CPC ............ *A47L 9/2852* (2013.01); *A01D 44/00* (2013.01); *A01G 33/00* (2013.01); *A47L 9/009* (2013.01); *A47L 9/02* (2013.01); *A47L 9/24* (2013.01); *A47L 9/2805* (2013.01); *A47L 9/2857* (2013.01); *G05D 1/0265* (2013.01); *B62D 55/12* (2013.01)

(58) Field of Classification Search
CPC .......... A47L 9/2852; A47L 9/009; A47L 9/02; A47L 9/24; A47L 9/2805; A47L 9/2857; A47L 2201/06; A47L 7/0004; A47L 9/28; A01D 44/00; A01G 33/00; G05D 1/0265; G05D 1/244; G05D 1/435; G05D 1/648; G05D 2105/10; G05D 2107/25; G05D 2109/10; G05D 2111/36; B62D 55/12; B62D 57/024; E04H 4/1654
See application file for complete search history.

(56) References Cited

U.S. PATENT DOCUMENTS

| | | | |
|---|---|---|---|
| 9,315,767 B1 | 4/2016 | Vozhdayev | |
| 9,879,210 B2 | 1/2018 | Vozhdayev | |
| 10,704,015 B2 | 7/2020 | Vozhdayev | |
| 2014/0263087 A1* | 9/2014 | Renaud ................. | E04H 4/1654 |
| | | | 210/745 |
| 2018/0124652 A1* | 5/2018 | Vozhdayev ........ | H04B 7/18563 |

(Continued)

*Primary Examiner* — Nathan A Bowers
(74) *Attorney, Agent, or Firm* — Winthrop & Weinstine, P.A.

(57) ABSTRACT

A robotic system for use within a fluid environment is provided. The robotic system may comprise a robot, a vacuum nozzle, an electromagnetic guide wire, and a control panel. The robotic system functions to aid in the production and/or collection of microbial biomass, plant biomass, debris, waste, suspended solids, suspensions, and other substances that are present in fluid suspensions within aquatic systems, marine environments, reactors, and photo-bioreactors, as well as submerged or partially submerged spaces.

20 Claims, 21 Drawing Sheets

(56) References Cited

U.S. PATENT DOCUMENTS

| | | | |
|---|---|---|---|
| 2018/0135325 A1* | 5/2018 | Schloss | E04H 4/1654 |
| 2023/0144509 A1* | 5/2023 | Yun | G05D 1/0225 |
| | | | 15/319 |
| 2023/0313549 A1* | 10/2023 | Lancry | E04H 4/1654 |
| | | | 15/1.7 |
| 2024/0391093 A1* | 11/2024 | Mura Yañez | G05B 15/02 |

* cited by examiner

MULTI-FUNCTIONAL AUTOMATED ROBOTIC SYSTEM FOR AQUACULTURE

CROSS-REFERENCE TO RELATED APPLICATIONS

The present application claims priority to U.S. Patent Provisional Application No. 63/356,481, entitled "A Multi-Functional Automated Robotic System for Submerged and Unsubmerged Applications," filed on Jun. 28, 2022.

FIELD OF THE INVENTION

The present disclosure relates to a robotic system for use in aquaculture. More particularly, the present disclosure relates to a robotic system for use in and around fluid environments. Even more particularly, the present disclosure relates to a multi-functional automated robotic system for use in bioreactors, aquaculture ponds, and other bodies of water, closed or open.

BACKGROUND OF THE INVENTION

Various challenges exist in aquaculture, biotech, and wastewater treatment that could benefit from a robotic solution that can be automated and have sensing capabilities.

Specific discussion is given to challenges in the collection of algae from aquatic environments but it is to be appreciated that similar challenges exist in a variety of technologies. The cultivation of photosynthetic algae and other aquatic microorganisms for food and natural products is common. More recently, with growing concerns over the negative impacts to the environment from fossil fuels, intensive agriculture practices, and other anthropogenic waste sources, algae cultivation is being considered as a source for renewable biofuels and as a method for the removal of pollutants from industrial and domestic wastewaters. To achieve meaningful results in applications such as biofuels and wastewater treatment, algae cultivation needs to occur on a scale of size and intensity much greater than previous implementations.

Algae cultivation has historically been a primarily pastoral practice, with minimal incorporation of scientific and engineering methods. Modern algae cultivation is quickly increasing in its sophistication. With this has come attention to quality attributes such as the chemical composition of the algae and its products, culture purity, optimum growing conditions, resource conservation of energy and water, and greater efficiency in the process of algae harvesting.

While various techniques, methods, and processes have been studied at the bench and pilot-scale, the advancement of algae cultivation to its full industrial potential has been challenging due to the lack of appropriate technology as well as high energy requirements that come from the need to harvest and dewater algae from dilute culture. One such technical gap becomes apparent in the cultivation of algae in large bodies of water, for example, raceway ponds, waste-treatment lagoons, and large enclosed bioreactors, which can be on the order of many thousands to millions of gallons of culture. Associated with these expansive cultivation spaces, is a challenge in monitoring, controlling, and harvesting algae cultures because of the large distances that must be traversed.

Managing such large cultures can result in extensive costs to install sensors at multiple points, to provide labor resources for sample collection and analytical testing, and to overcome efficiency losses due to poor mixing within the culture volume.

Furthermore, the harvesting of algae cells can present a significant cost burden in terms of water and energy consumption if the entire volume of water must be filtered to isolate the cells. Gravity settling is a commonly observed phenomenon among algae and various other suspended particles, and is sometimes used as an alternative means for collecting the algae or suspended particles. If the culture fluid is left undisturbed for a sufficient time, then those cells or suspended particles that have a higher density than water will slowly sink to the bottom of the reactor. As the time for gravity settling increases, fluid in the top of the reactor decreases in cell concentration while fluid in the bottom of the reactor increases in cell concentration. Thus, by removing only the layer of fluid at the bottom of the reactor—for example by a drain valve on the floor of the reactor or by using a submersible vacuum—a significant fraction of the cells can be collected while the most of fluid is allowed to remain in the reactor.

Several patents relate to photo-bioreactors for producing biomass and are hereby incorporated by references: U.S. Pat. No. 9,315,767 entitled "Photo-bioreactor for mass production of photosynthetic organisms" and owned by the present assignee provides a photo-bioreactor system for producing biomass. U.S. Pat. No. 9,879,210 entitled "Photo-bioreactor for mass production of photosynthetic organisms" and owned by the present assignee provides a photo-bioreactor for producing biomass. U.S. Pat. No. 10,704,015 entitled "Photo-bioreactor for mass production of photosynthetic organisms" and owned by the present assignee provides a photo-bioreactor for producing biomass.

A solution is needed to attain certain parameters within a culture volume. Such need is not limited to closed photo-bioreactors for photosynthetic cultivation, but is much broader, and has application in open systems, heterotopic cultivation, fermentation systems, open raceway ponds, aquaculture, lagoons, and waste water treatment applications.

BRIEF SUMMARY OF THE INVENTION

The following presents a simplified summary of one or more embodiments of the present disclosure in order to provide a basic understanding of such embodiments. This summary is not an extensive overview of all contemplated embodiments, and is intended to neither identify key or critical elements of all embodiments, nor delineate the scope of any or all embodiments.

In some embodiments, a robotic system for use within a fluid environment is provided. The fluid environment may be a closed water body, such as a growth chamber, or an open water body. The robotic system may comprise a robot, a vacuum nozzle, an electromagnetic guide wire, and a control panel. The robot may comprise a robot main body and at least one pair of wheels, the pair of wheels being housed within a continuous track. The vacuum nozzle may protrude from the robot main body. The electromagnetic guide wire forms a guide path configured for the robot to follow within the fluid environment. The control panel allows a user to interface with the robot for controlling functions of the robot within the fluid environment. The robot collects waste, biomass or particulate material from within the fluid environment using the vacuum nozzle. The robot may further be configured to collect information. The information may be at least one of pH, temperature, pressure, shear stress, viscosity, fluid velocity, local light intensity, concentration of various chemicals and suspended particles ionic strength, and visual images of the fluid within the fluid environment. In some embodiments, the robotic system may further comprise more than one robot connected in a communication network within the fluid environment or within multiple fluid environments.

In further embodiments, the robot comprises two pairs of wheels, with the first pair of wheels being provided on a first side of the robot main body and the second pair of wheels being provided on a second side of the robot main body, each pair of wheels being housed within a continuous track. The robot may further comprise at least one pump and a hose. The pump may be connected to the vacuum nozzle and may be configured for generating fluid momentum. The hose may be attached to the pump and be configured to transfer material from the fluid environment for collection.

The electromagnetic guide wire may be placed to cover an area of interest within the fluid environment, the placement of electromagnetic guide wire forming the guide path. Electrical current passing through the electromagnetic guide wire may oscillate in a periodic waveform and generate a corresponding magnetic field. The system may further comprise at least one electromagnetic guide wire sensor present onboard the robot main body, wherein the electromagnetic guide wire sensor detects the magnetic field generated by the electromagnetic guide wire. The system may further comprise a radio frequency identification (RFID) tag which facilitates wireless communication with an RFID tag reader In further embodiments, a method of using a robotic system within a fluid environment is provided. The fluid environment may be a closed water body, such as a growth chamber, or an open water body. The method comprises laying an electromagnetic guide wire within the fluid environment to form a guide path covering an area of interest within the close fluid environment, placing a robot within the fluid environment, positioning the robot over the electromagnetic guide wire, navigating the robot along the guide path, collecting material from within the fluid environment using the robot, and transferring the material from the fluid environment to a location outside the fluid environment. The method may further comprise using the robot to collect information about the fluid environment from within the fluid environment. The information may be at least one of pH, temperature, pressure, shear stress, viscosity, fluid velocity, local light intensity, concentration of various chemicals and suspended particles ionic strength, and visual images of fluid within the fluid environment. The robot may collect information on presence or absence of an object in close proximity to the robot within the fluid environment. The robot may comprise an artificial intelligence system. The artificial intelligence system may be programmed to receive, process and act upon data received from the robot.

In some embodiments, a robotic system is provided. The robotic system may comprise an automated robot, an electro-magnetic guide wire, at least an accessory for producing and/or collecting biomass, such as a pump and/or a vacuum nozzle, and a control panel is provided. The robotic system functions to aid in the production and/or collection of microbial biomass, plant biomass, debris, waste, suspended solids, suspensions, and other substances that are present in fluid suspensions within aquatic systems, marine environments, reactors, and photobioreactors, as well as submerged or partially submerged spaces.

In various embodiments, the present disclosure provides an automated robotic system comprising an automated robot wherein the automated robot comprises a main vehicle body, a hose, wherein the hose is connected to the main vehicle body through vacuum nozzle or pump volute; a pumping system comprising a pump, a pump electronic enclosure, and a pump volute; a circuit board enclosure, wherein the circuit board enclosure encloses the circuitry necessary for proper functioning and guidance of the robot, a chassis center plate, a vacuum nozzle, wherein the nozzle may be of any geometrical shape extending through, along, or antiparallel to the length of the robot and protruding on either side of the main vehicle body and providing support to the main vehicle body; at least one wheel on either side of the main vehicle body, wherein the wheel is rotatably mounted and free or spanned by a track wherein the track is a closed and continuous track spanning a majority of wheels width; and a control panel, wherein the control panel allows interfacing with the robotic system by external touch screen, computer, or buttons, in order to control the functions performed by the automated robot; and at least one accessory, wherein the accessory may be connected to the main vehicle body of the automated robot for performing functions to manage the aquatic body or a reactor, such as in the production of photosynthetic microalgae, macroalgae or other microbial species, such as heterotrophic microorganisms, for cleaning the aquatic system, for removing objects, waste or debris from the aquatic system, for cleaning the fluid within the aquatic system, for loading the aquatic system with nutrients or chemicals or for transporting the fluid to or from the aquatic system.

In various embodiments, the automated robotic system may be connected to a photo-bioreactor, wherein the photo-bioreactor contributes to optimal large-scale production of photosynthetic organisms. The reactor is designed to withstand gravitational forces, the pressure force of the contained fluid, the drag force of the wind, or other forces acting on the reactor when in use or otherwise. In many embodiments, the reactor comprises a frame structure, such as a geometrical shaped frame structure, referred to as a growth chamber or growth chamber, wherein the growth chamber provides and contributes to large scale production of photosynthetic organism. In various embodiments, the growth chamber is filled with algae culture, water, and necessary nutrients for biomass production.

In various embodiments, the automated robotic system may be connected to a bioreactor, wherein the bioreactor contributes to optimal large-scale production of microorganisms, fish, or animals. The reactor is designed to withstand gravitational forces, the pressure force of the contained fluid, the drag force of the wind, or other forces acting on the reactor when in use or otherwise. In many embodiments, the reactor comprises a frame structure, such as a geometrical shaped frame structure, referred to as a growth chamber or growth chamber, wherein the growth chamber provides and contributes to large scale production of photosynthetic organism. In various embodiments, the growth chamber is filled with microbial culture, fish, or animals, water, and necessary nutrients for biomass production.

In various embodiments, the automated robotic system may be connected to a photo-bioreactor, wherein the reactor contributes to optimal large-scale production of plant-like photosynthetic organisms in an open water body, such as an open raceway pond.

In various embodiments, the disclosure provides a multifunctional automated robotic system for cleaning a water body, comprising an automated robot, comprising a main vehicle body, a pair of wheels on each side of the main vehicle body, wherein the pair of wheels is housed within a flexible track, at least one brush, wherein the brush is mounted externally to the outside of the main vehicle body; a pump for creating fluid momentum; and a vacuum nozzle, wherein the nozzle extends through the length of the automated robot protruding on either side of the main vehicle body and providing support to the automated robot; an electro-magnetic guide wire, wherein the electro-magnetic guide wire forms a guided path for the movements of the automated robot; an electro-magnetic guide wire sensor for detecting the electro-magnetic guide wire; and a control panel, wherein the control panel allows interfacing with the automated robotic system to control the functions performed by the automated robot.

In many embodiments, disclosed herein is a method of using an automated robotic system for harvesting photosynthetic or heterotrophic microorganisms, comprising: connecting an enclosed containment chamber to a main vehicle body of the automated robot, wherein a hose from the main vehicle body of the automated robot passes through a panel of the containment chamber from one side of the panel to another side of the panel, wherein the containment chamber comprises a transparent panel; filling the containment chamber with a volume of water and a nutrient solution, wherein the transparent panel allows entry of light to enter the containment chamber to initiate microbial growth of the photosynthetic organisms; positioning at least one substrate delivery tube along a vertex of the containment chamber, wherein the substrate delivery tube comprises a plurality of perforations and dispersing a substrate material evenly within the containment chamber; positioning at least one gas supply tube along each side of the containment chamber, wherein the air sparger comprises a plurality of perforations and air stream through the perforations helps in dislodging biomass produced within the containment chamber; and collecting biomass produced within the containment chamber through the vacuum nozzle.

In many other embodiments, the present disclosure relates to a method of using the automated robot as a cleaning device for cleaning waste from a water body, comprising: laying a electro-magnetic guide wire on a floor of a water body, wherein the electro-magnetic guide wire is laid across an area of interest within the water body; positioning the main vehicle body of an automated robot over or near the electro-magnetic wire by submerging the automated robot and placing it over the electro-magnetic guide wire, or allowing the robot to self-align, such that the main vehicle body is centrally positioned; moving the automated robot over the electro-magnetic guide wire within the area of interest as defined by the electro-magnetic guide wire, wherein the automated robot may collect waste, various substances, or objects from the water body due to a vacuum created by the pump within the automated robot; and transferring the waste, various substances, or objects that are removed from the water body with the hose into a collection tank, which may be located inside or outside of the water body.

In many embodiments, disclosed herein is a method of using an automated robotic system for harvesting photosynthetic microorganisms. In some embodiments, the method may use an automated robotic system to harvest non-photosynthetic microorganism. The method of using an automated robotic system for harvesting microorganisms may comprise: connecting an enclosed containment chamber to a main vehicle body of an automated robot, wherein a hose from the main vehicle body of the automated robot passes through a panel of the containment chamber from one side of the panel to another side of the panel, wherein the containment chamber comprises a transparent panel; filling the containment chamber with a volume of water; at least nutrient solution, wherein the transparent panel allows entry of light to enter the containment chamber to initiate microbial growth of the photosynthetic organisms; positioning at least one substrate delivery tube along a vertex of the containment chamber, wherein the substrate delivery tube comprises a plurality of perforations and dispersing a substrate material evenly within the containment chamber; positioning at least one gas supply tube along each side of the containment chamber, wherein the air sparger comprises a plurality of perforations and air stream through the perforations helps in dislodging biomass produced within the containment chamber; and collecting biomass produced within the containment chamber through the vacuum hose.

In various embodiments, the disclosed robot is a multi-functional, automated robot, wherein the robot may be submerged and move across, within, or beside a water body. The water body may be a closed water body or an open water body, such as but not limited to a membrane-contained reactor bag. The multi-functional automated robot functions as a water cleaner by cleaning debris, cells, particles, or objects or other materials from the closed water body or the open water body.

In various other embodiments, an automated robot is provided wherein the robot is submerged or partially submerged within or beside a closed or open water body and functions by collecting debris, objects, or various other substances from the water body for temporary holding within a collection unit inside the main vehicle body or located elsewhere. The collection unit is controlled remotely via the control panel and sensors, such that sensors may detect volume, cell density, light intensity or other relevant indicators in the collection unit, send alerts when a task is complete, and switch tasks when the programmed task is complete.

While multiple embodiments are disclosed, still other embodiments of the present disclosure will become apparent to those skilled in the art from the following detailed description, which shows and describes illustrative embodiments of the invention. As will be realized, the various embodiments of the present disclosure are capable of modifications in various obvious aspects, all without departing from the spirit and scope of the present disclosure. Accordingly, the drawings and detailed description are to be regarded as illustrative in nature and not restrictive.

BRIEF DESCRIPTION OF THE DRAWINGS

The accompanying drawings, together with the detailed description below, are incorporated in and form part of the specification and serve to illustrate embodiments of concepts that include the claimed disclosure and explain various principles and advantages of those embodiments.

The process and embodiments disclosed herein have been represented where appropriate by conventional symbols in the figures showing specific details that are pertinent to understanding embodiments of the present disclosure so as not to obscure the disclosure with details that will be readily apparent to those of ordinary skill in the art having the benefit of the description herein.

FIG. 4(*b*) illustrates an exploded view of the robot of FIG. 1.

FIG. 5(*b*) illustrate a right side view of the robot of FIG. 1.

FIG. 8(*b*) illustrates a side view of a containment structure, in accordance with one embodiment.

FIG. 13(*b*) illustrates a perspective view of an automated robot in an open water body, in accordance with one embodiment.

DETAILED DESCRIPTION

Figure 1:
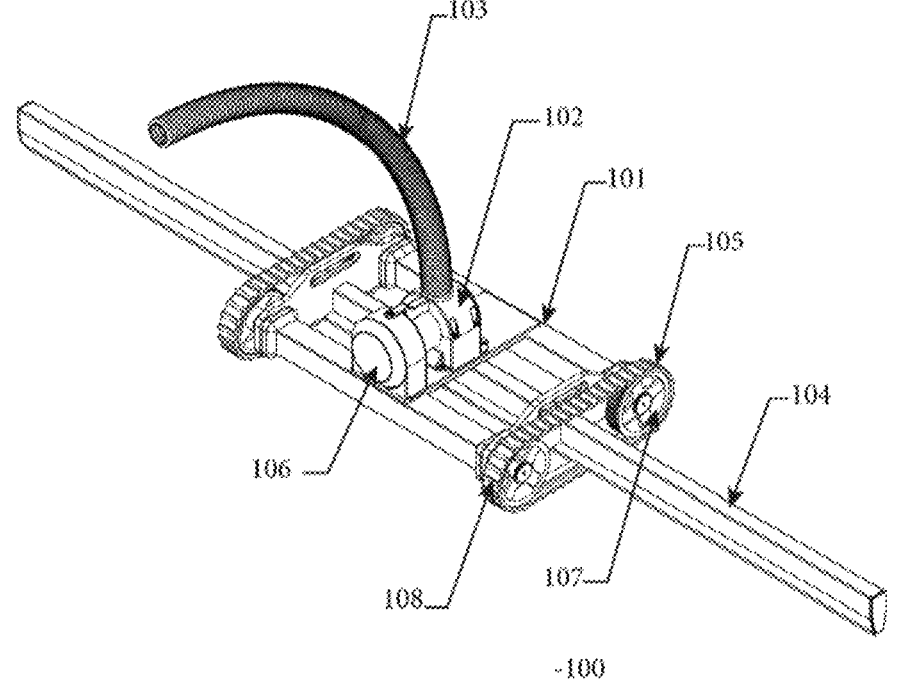
FIG. 1 illustrates a robot in accordance with one embodiment.

The present disclosure relates to a robotic system and its use in aquaculture. More particularly, the present disclosure relates to a robotic system and its use in and around a fluid environment. Even more particularly, the present disclosure relates to a multi-functional automated robotic system for use in bioreactors, aquaculture ponds, and other bodies of water, closed or open.

In some embodiments, a multi-functional, submersible, automated, robotic system, comprising: an automated robot, an electro-magnetic guide wire, at least an accessory for producing and/or collecting biomass, such as a pump and/or a vacuum nozzle, and a control panel is provided. The robotic system functions to aid in the production and/or collection of microbial biomass, plant biomass, debris, waste, suspended solids, suspensions, and other substances that are present in fluid environments within aquatic systems, marine environments, reactors, and photobioreactors, as well as submerged or partially submerged spaces.

It is to be understood that the description of the disclosed robotic system, and robot thereof, are not limited to particular embodiments and uses described. Variations will be apparent to those skilled in the art. The description herein is intended to cover such alternatives, modifications, and equivalents as may be included within the spirit and scope of the present technology as appreciated by one of ordinary skill in the art.

There is an increasing focus on the use of algae monocultures for higher value products. With that focus, there is a need to limit sources of external contamination of the algae monocultures and thus to reduce human interactions with cultural media during operations such as sample collection and biomass harvesting. The present disclosure provides a robot that facilitates process automation and remote sensing for algae cultivation. The robot may further be used in any suitable aquaculture, wastewater, or similar application.

The present disclosure describes a novel, robotic system to address challenges associated with the operation of large scale, submerged cultures, such as algae, aquatic plants (i.e. hyrophytes or marophytes), other suspended microorganisms, animals, or suspended particles, reactions, and physical transformations, in general, within an aquatic or fluid environment, such as natural water bodies with their surroundings and enclosed or partially enclosed fluid reservoirs and their surroundings. More specifically, while specific discussion is made of harvesting, the robot may be used to perform a plurality of functions for algae cultivation or other aquaculture activities.

In some embodiments, aspects of the disclosure include: 1. an autonomous (or remote controlled) robotic system; 2. capable of aseptic operation in submerged or partially submerged fluid environments; 3. capable of collecting and conveying a concentrated stream of cellular biomass (or other particulates) from fluid suspensions; 4. capable of controlled locomotion across large distances within the fluid body; 5. capable of collecting information from the environment with on-board instruments (e.g. electro-magnetic field sensors, chemical probes, dissolved gas sensors, pH and temperature probes, and cameras for visual inspection); and 6. able to perform various chemical and physical transformations within the environments using additional attachments, e.g. fluid mixing and heating, light distribution, discharge of electrical currents for cell flocculation, the release of gasses, nutrients and other chemicals, filtration of impurities, and cleaning of reactor surfaces etc.

A robot such as disclosed herein can be used to collect algae or other particles that have settled to the bottom of an aquatic body, via a vacuum nozzle mounted on the disclosed device. This conserves water by allowing a top layer of algae-depleted water to remain inside the aquatic body. The disclosed robot may be automated and/or remote controlled and may function as a part of a cultivation process, in addition to other functions.

Provided herein is a multi-functional, submersible robotic system for collecting biomass, waste, or other particulates from fluid suspensions, such as but not limited to, a pool, pond, lake, lagoon, vessel, tank, trench, duct, pipe, channel, canal, reservoir, aquatic systems, marine environments, reactors, and photobioreactors, as well as submerged or partially submerged spaces or other water body or hydraulic structure for constraining or controlling the flow of fluid to clean fluid suspensions within the aquatic system, or to manage the environment within a fluid reservoir. The biomass that is present in submerged or partially submerged spaces may occur there naturally, as in a lake, reservoir, irrigation dike, holding tank, or evaporation basin, or it may be purposefully cultivated or cultured, as in a waste treatment lagoon, open raceway pond, closed photobioreactor, or other growth chamber.

Biomass in the space may be produced from various metabolic processes, including phototrophic, lithotrophic, heterotrophic, and/or mixotrophic metabolism. In one embodiment, the robotic system may be used to collect, also referred to as "harvest", cultivated biomasses from micro-organisms, plants, or animals present in bodies of water. In other embodiments, the robot may be used to dislodge, force to move, and/or remove biomass, waste, debris, suspended solids, or other substances to clean water bodies and surfaces within water bodies.

In some embodiments, an automated robotic system is provided comprising an automated robot, a electro-magnetic guide wire and guide-wire sensor, a control unit, and an accessory is provided. The electro-magnetic guide wire forms a guided path for navigation of the automated robot within a fluid suspension within an aquatic system. The control panel allows a user to interface with the automated robotic system to control the functions performed by the automated robot and report available information from the fluid environment. The accessory is coupled to the auto-mated robot and is configured for performing a useful task.

Generally speaking, the automated robotic system can be used to manage a fluid environment such as an aquatic system or fluid reservoir. Managing may include, but is not limited to, growing microorganisms, plants, or animals, collecting biomass, removing debris or other substances, heating or cooling the environment, mixing of the fluid, solids dewatering, collecting samples from the fluid environment, monitoring water quality and environmental conditions, probing the fluid environment with various instruments to measure, temperature, pH, salinity, concentration of dissolved chemicals and gasses, and concentration of suspended matter or microorganism, cleaning the fluid environment and its adjacent surfaces, dispersing various chemicals and gasses, and performing physical alterations the fluid environment and its contents.

In one embodiment, the present disclosure provides a robot comprising a main vehicle body, wherein the main vehicle body comprises a pump, a pair of wheels, a control panel, and a vacuum unit (also referred to as a vacuum attachment). The robot may be automated, controlled via remote control, or other. The robot may be multi-functional or may be configured for a single purpose. Throughout this specification and claims, the phrases "multi-functional auto-mated robot," "automated robot", "automatic robot", "robot" and "harvest apparatus" are used interchangeably. "Automated robot" may refer to a fully autonomous robot, a preprogrammed robot, a robot with machine learning capabilities, a robot that is controlled via remote control, etc.

In various embodiments, the robot may comprise a main vehicle body, a pump for generating fluid momentum, a vacuum unit comprising a hose and a nozzle, and a control panel. The control panel may be located onboard the robot or in a place remote from the main vehicle body. The control panel may be used to direct various functions of the robot via a manual command or may be used to program automated functioning by the robot. The wheels operate to transport the automated robot and may be motor-driven. The vacuum attachment may extend through a length of the automated robot and supports the main vehicle body and pump.

Figure 8A:
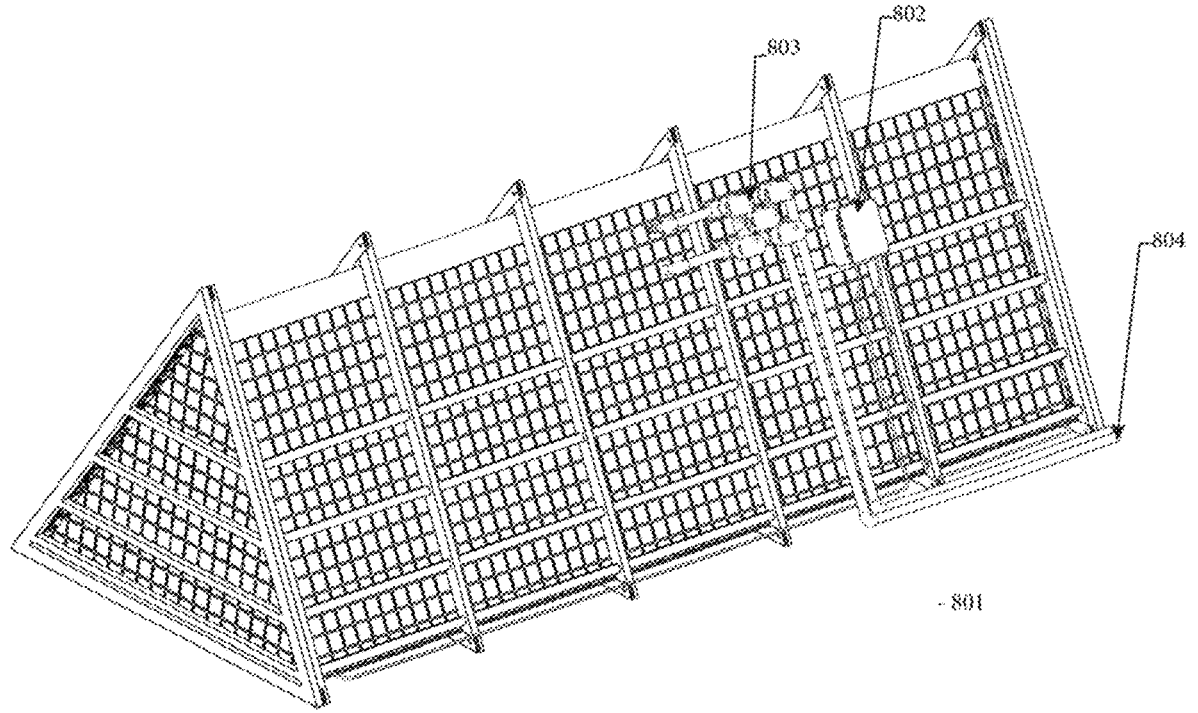
FIG. 8(*a*) illustrates a framed containment structure to support a growth chamber, in accordance with one embodiment.
Figure 8B:
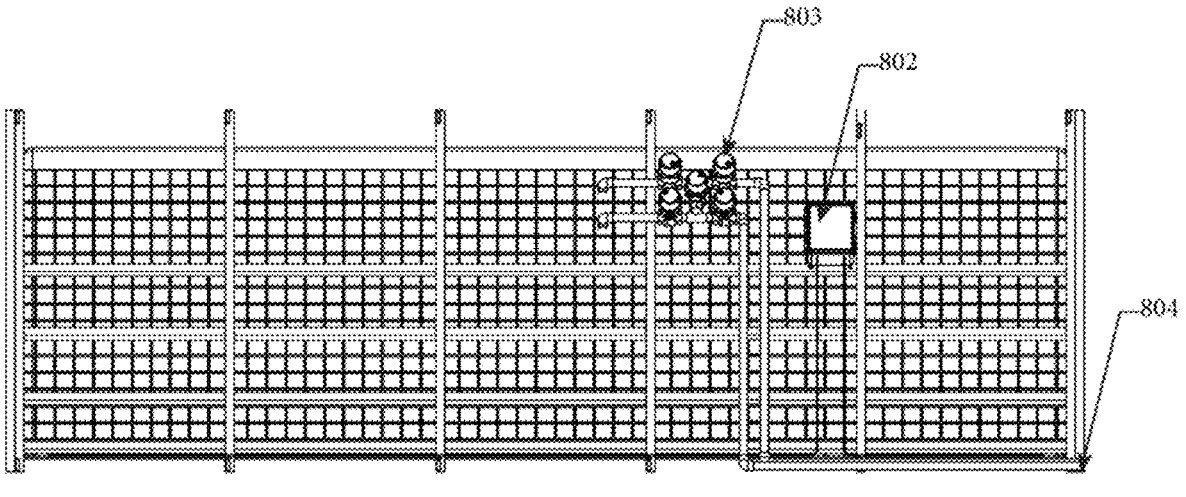

In various embodiments, the automated robotic system comprises a control panel for monitoring and controlling the functioning of a growth chamber (for example as shown in FIGS. 8(a) and 8(b), such as temperature, pH, and mixing, dispensing of chemicals, nutrients, or dissolved gasses, operation of the pump, operation of the automated robot itself, including its orientation, direction of travel, motor speed, and acceleration, or the execution of other functions and associated instruments, valves, and actuators. The automated robotic system further comprises circuitry within the control panel for controlling the functions described herein. The control panel provides for capabilities such as controlling movement of the robot, delivering data, communications, Controlling movement may include controlling the direction of the robot and moving the robot in the forward, backward, inclined, declined or transverse directions,. Data delivered may be used for managing the fluid environment, the growth of microorganisms within the fluid environment, collection of microorganisms biomass or other substances from fluid environments. Communications may be between various parts of the automated robot. The control panel may further be used for controlling for valves, flow meters, pressure or vacuum regulators, electronics, instruments, associated tools, or controlling functions of the automated robot for removal and/or harvest of cells, biomass, debris, objects, or other substances from the water bodies. The control panel may include safety shut-off means including a sensor for determining a fault condition within the automated robot or during the automated robot functioning, thereupon either implementing corrective action or other-wise turning the automated robot off until the problem can be managed and corrected.

FIG. 1 illustrates a robot according to an embodiment. The robot may be provided as part of a robotic system. The robot may be multi-functional or may be configured for a single purpose. The robot may be automated, including controllable via remote control or programming. As shown, the robot 100 may comprise a main vehicle body 101 having a length. The main vehicle body may comprise a pump volute enclosure 102 and a pump motor enclosure 106. The robot 100 may further include a vacuum unit (or vacuum attachment). The vacuum unit may comprise a vacuum nozzle 104 and a vacuum hose 103. The hose 103 may be attached to the pump volute enclosure 102. The hose contains and directs pumped biomass, waste products, unwanted debris, or other matter collected by the robot from a water body. The vacuum nozzle 104 may run through all or a portion of the length of the main vehicle body. In some embodiments, the vacuum nozzle 104 may extend outwardly from either side of the main vehicle body. The pump creates a vacuum running through the vacuum nozzle 104 while the robot is in use. More specifically, the onboard pump creates fluid suction for purposes of removing collected biomass, waste, debris, or other suspended particles from the fluid environment.

The vacuum unit may be externally mounted vacuum attachment or nozzle, wherein fluid flowing through a suction pump is controlled by one or more constricting or diverging nozzles in order to create a local velocity gradient in the external fluid surrounding the opening of the vacuum nozzle. In some embodiments, the vacuum attachment may connect directly to the vacuum pump and a hose may be mounted on a discharge end of the vacuum pump to convey vacuumed fluid to the outside of the reactor. The local velocity gradient induces external fluid and any entrained particles to flow into the robot's fluid collection system. The shape of the vacuum attachment and its associated nozzle(s) may be arranged in any configuration or orientation and assisted by the presence of various other flow controlling surfaces such as fins, brushes, structural partitions, screens, velocity diffusers, sponges and/ or flexible squeegees to enhance the function of the vacuum unit.

In one embodiment, the vacuum attachment may comprise a long, cylindrical tube, approximately 1" to 6" in diameter and similar in length to that of the width of a reactor floor (~6" to 16'), having both ends capped, and with a thin slit (~0.06-0.5" in width) cut down the length of the ventral surface of the tube. At the center of the dorsal surface of the vacuum nozzle, the attachment may be attached perpendicularly to another section of tubing or conical nozzle that connects to the internal robot plumbing system and converges in diameter as it runs from the attachment and toward a robot plumbing inlet.

The automated robotic system further comprises a discharge hose and/or tubing, wherein the hose is attached to the main vehicle body of the automated robot and provides a conduit to help convey, transfer, circulate, and/or recycle biomass, waste, debris, nutrients, gasses, chemicals or other substances from the water body to another location such as a collection tank, sample port, analytical instrument, other process equipment, or to a recycle point located elsewhere within or outside the aquatic system. In other embodiments, additional hoses and/or tubes may be provided for conveying multiple substances.

In various embodiments, the hose and associated pump may be used to distribute or recycle a portion of the culture volume or fluid from within the fluid environment to another location within the fluid environment.

In other embodiments, the pump and hose may be used as a method of fluid circulation, liquid mixing, particle dispersion, homogenization, or gas dispersion and dissolution within the liquid, such as within a water body or an aquatic body, or a fluid reservoir.

The automated robotic system may further comprise a conveying device, such as a pump, auger, blower, vacuum or other means of material conveying, wherein the conveying device is used to transfer collected biomass, waste, debris, or other materials from the water body and deliver it to a collection tank or another location within or outside of a fluid environment. The pump may be carried onboard the robot's main vehicle body or located elsewhere within or outside the fluid environment.

In some embodiments, fluid suction for removing material from a fluid environment and fluid pumping for conveying the material to another location are provided by the same pump and delivered from the suction and discharge ports of the same pump, respectively.

In other embodiments, additional pumps may be used for transferring substances from outside the robot to inside the robot for purposes of dispersing within the fluid environment. For example, pumps or blowers, located either onboard the robot or removed from the robot, may be used for conveying air, other gases, nutrients, chemicals, and suspensions into the robot for dispersal into the fluid environment.

In various embodiments, the main vehicle body of the robot comprises at least a right-side wheel and at least a left side wheel rotatably mounted and positioned on either side of the main vehicle body. The left side wheel and/or the right-side wheel maybe motor-driven for automated robot locomotion.

In the embodiment shown in FIG. 1, the robot may comprise at a pair of wheels 107 on each side of the main vehicle body 101. The wheels may be motor-driven and can be used for moving the robot from one position to the next. In the embodiment shown, the wheels are encased within a continuous track 105, wherein the track further comprises a plurality of teeth 108 protruding outwardly therefrom. The plurality of teeth create traction for moving the automated robot along a surface while submerged in a water body or operating over other low density or fluid suspension.

In various other embodiments, the wheels may be mounted on each side of the main vehicle body, wherein the wheels may be free, or may be housed within a continuous track spanning a majority of the wheels' width. The track's surface area may wrap around the wheels' outer body to distribute the load of the vehicle more uniformly along a latitudinal axis while keeping the wheel covered within the continuous track. Materials for construction of such track may include an elastomeric compound (e.g. synthetic or natural rubbers), thermoplastic polymers, thermoset polymers, various metals, or a combination of these. Rotation of the wheels, whether independent or operating within the continuous track, may move the automated robot forward, backward, left, right, or up an incline and down an incline while in use. The rotation of two or more wheels may be driven by a common transaxle or transaxles connected to one or more motors. Conversely, one or more wheels may be driven by its own independent motor.

In various embodiments, the continuous track comprises a plurality of teeth on its outer surface present distally. The edges protrude distally from the outer surface of the continuous track. The teeth create traction and/or friction necessary for moving the automated robot during use such as while moving to new locations within the fluid environment or aquatic system.

Figure 2:
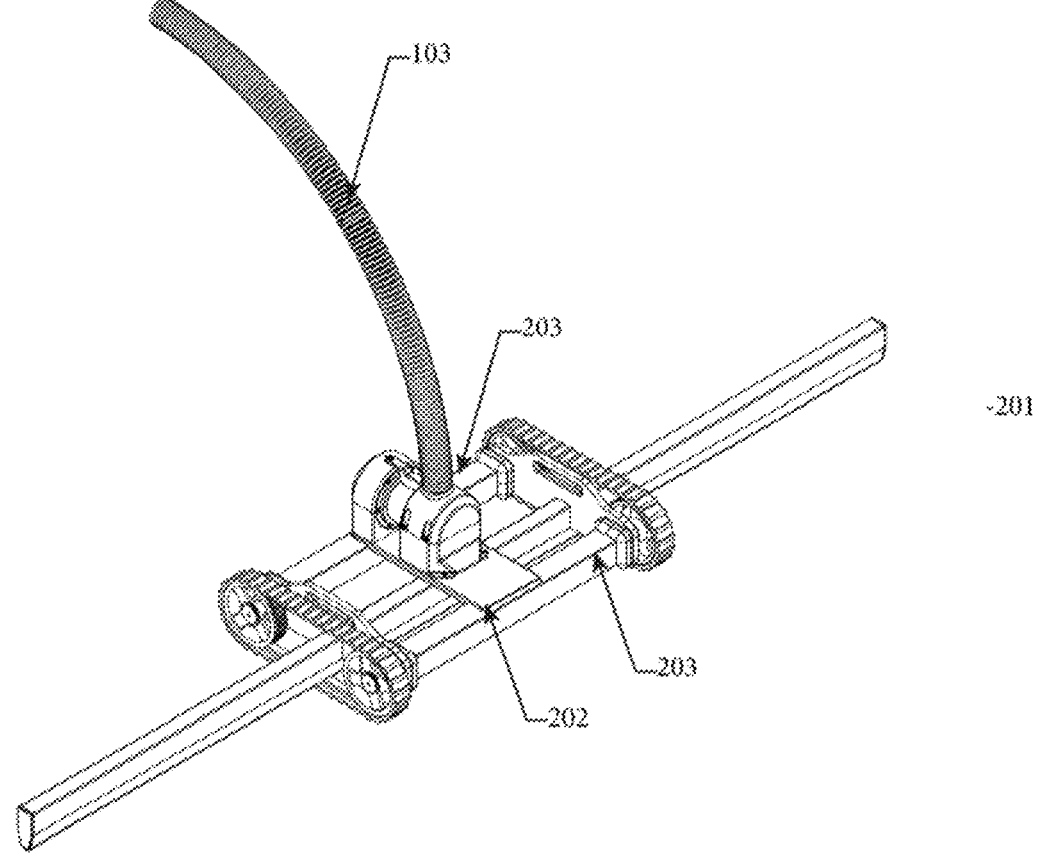
FIG. 2 illustrates a top, front perspective of the robot depicted in FIG. 1.

FIG. 2 illustrates a top front view of a multi-functional automated robot 100.

As shown in FIG. 2, the hose 103 may be flexible such that the hose can move in one or more directions, including in all directions, while connected to the pump volute enclosure 102. The hose 103, with the help of a vacuum created by the pump within the automated robot, operates to collect/harvest settled biomass, debris, waste, microorganisms, or other substances from water bodies in which the automated robot may be submerged. The robot may further include one or more electronics enclosures 203 for housing electronic components used for functioning of the robot. In the embodiment shown, two electronics enclosures 203 are provided.

A chassis plate 202 may be provided. The chassis plate may comprise a flat surface and may be provided generally centrally on an upper surface of the vehicle main body. The chassis plate 202 may have a long surface and a short surface with the long surface being oriented perpendicularly to the vacuum nozzle. The chassis plate 202 may support an accessory attached to the robot. The chassis plate may further support the pump motor enclosure 106 and pump volute enclosure 102, and connect the electronics enclosures 203. The chassis plate may be of any geometrical shape. In general, the surface area of the plate may be equal to or greater than a combined surface area of the pump motor enclosure 106 and pump volute enclosure 102.

The electronics enclosures 203 may comprise PCB (printed circuit board) enclosures. In some embodiments, for example to provide additional space, the robot may include more than one electronics enclosure 203.

Figure 3A:
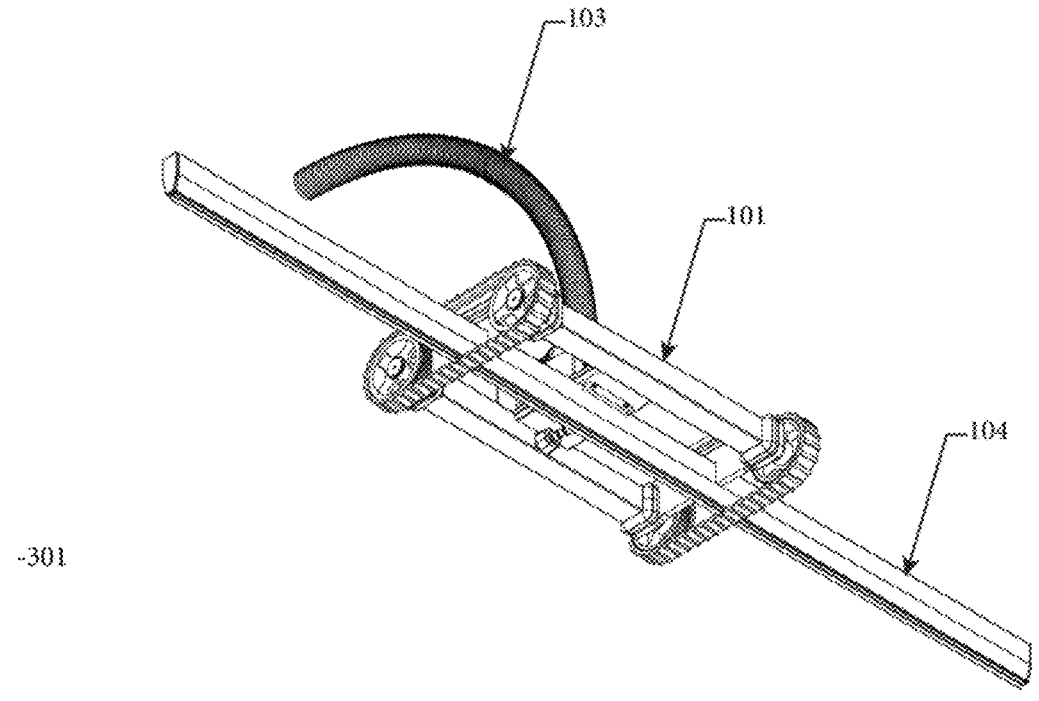
FIG. 3(a) illustrates a bottom, front perspective of the robot of FIG. 1.
Figure 3B:
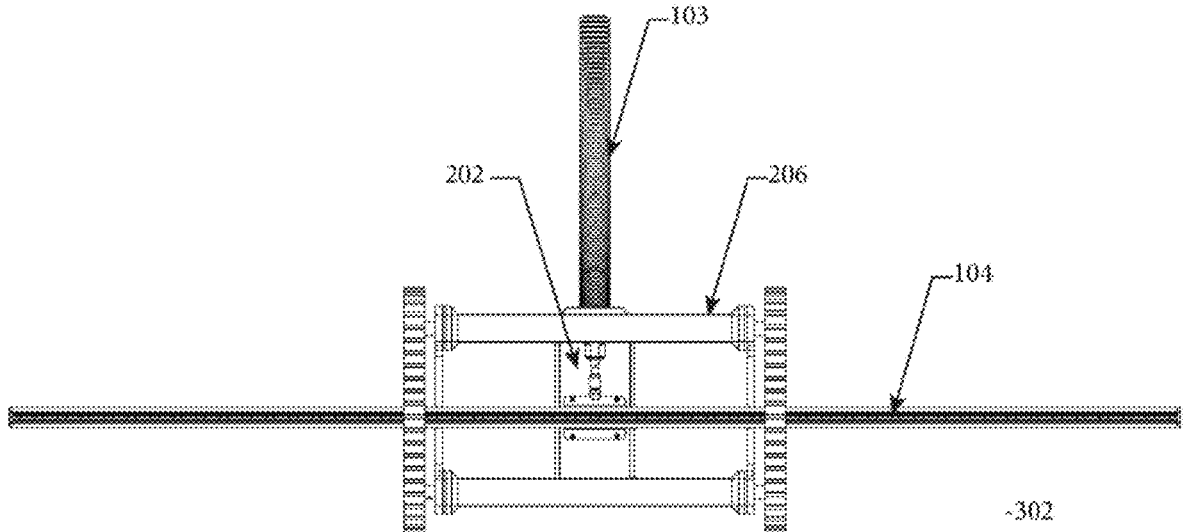
FIG. 3(b) illustrates a bottom view of the robot of FIG. 1.

FIGS. 3(a) and 3(b) illustrate bottom-side and bottom views, respectively, of the automated robot 100. The hose 103 may be configured such that it can bend and move in various directions. In the embodiment shown, the vacuum nozzle 104 runs through the length of the main vehicle body 101 and extends on either side of the main vehicle body, thus defining an operating length of the automated robot. FIG. 3(b) illustrates that the electronics enclosures 203 may run parallel to the vacuum nozzle 104, with one provided on each side of the vacuum nozzle. In alternative embodiments, other configurations may be used.

Figure 4A:
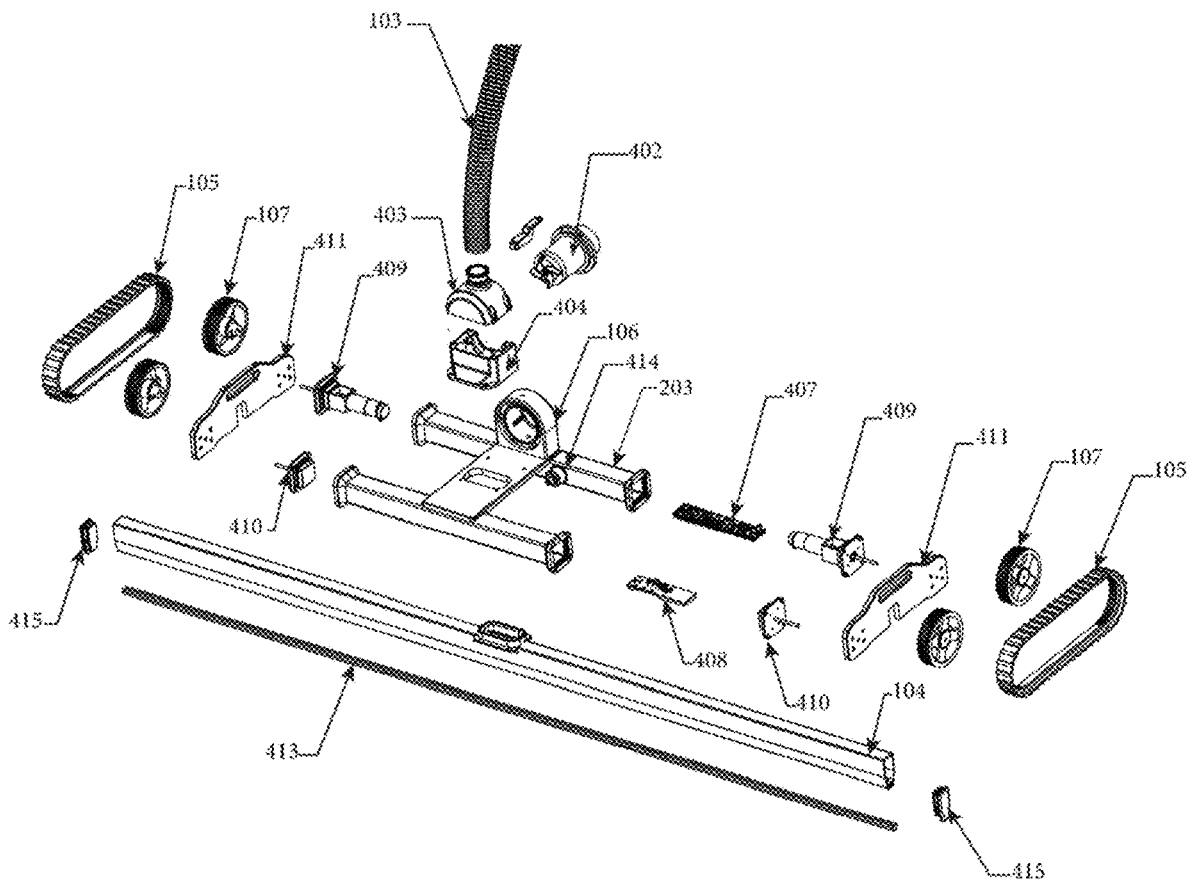
FIG. 4(*a*) illustrates an exploded view of the robot of FIG. 1.
Figure 4B:
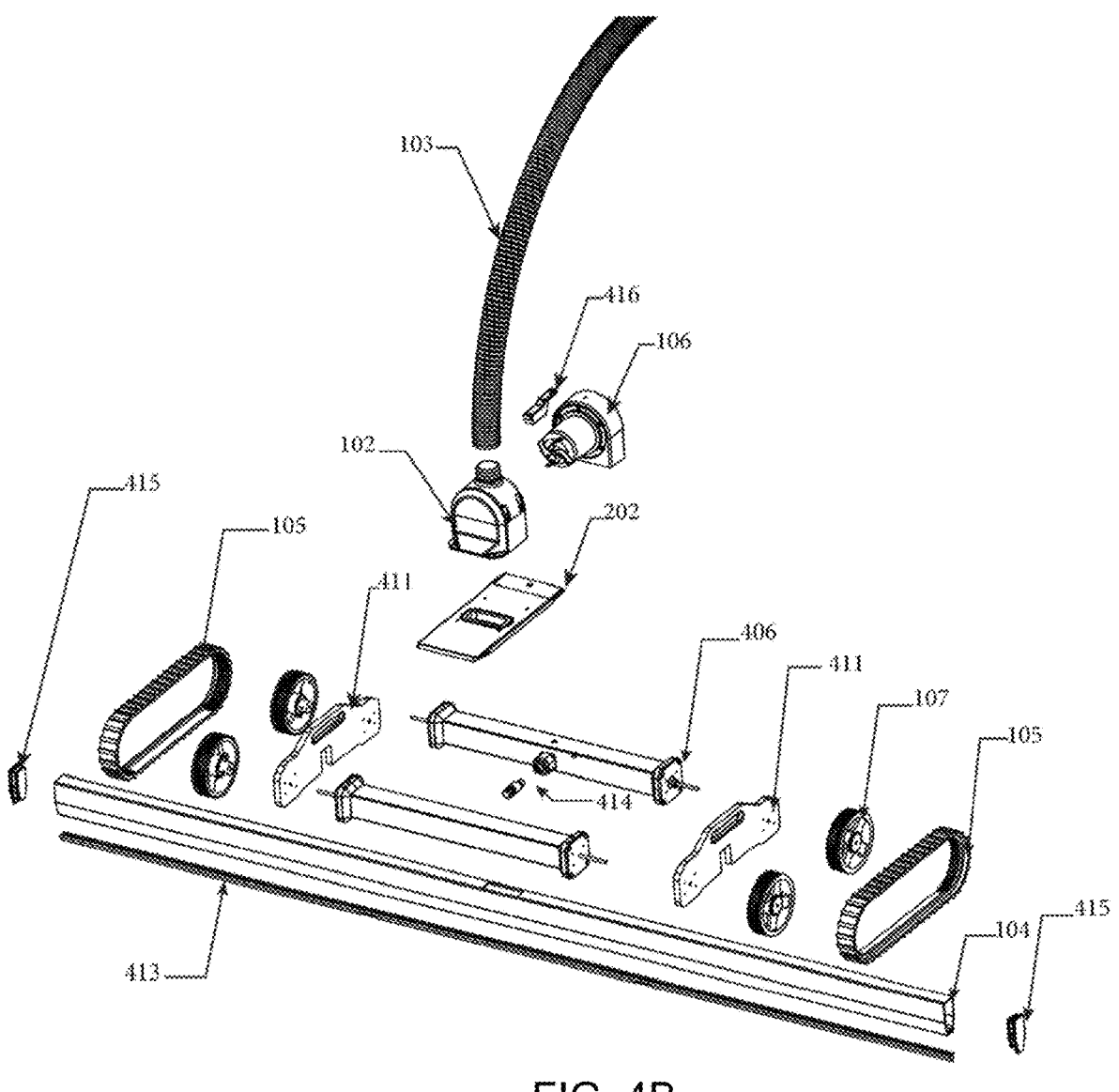

FIGS. 4(*a*) and 4(*b*) illustrate exploded views of a multi-functional automated robot. As shown, the robot may include the hose 103, vacuum nozzle 104, track 105, pump motor enclosure 106, wheels 107, main body enclosure 206, pump 402, pump volute top case 403, pump volute base 404, main body circuit board 407, front circuit board 408, dive motor and seal plate assembly 409, front enclosure seal plate assembly 410, chassis side plates (or brackets) 411, vacuum nozzle squeegee 413, power communication port 414, and vacuum nozzle end cap 415. The flexible squeegee may be attached immediately adjacent to and running parallel along the length of the ventral slit. It is to be appreciated while these components are shown in an exemplary embodiment, not all components may be used and/or other components may be used in a robot in accordance with the disclosure herein.

FIG. 4(*a*) illustrates a drive motor and seal plate assembly 409 located at ends of a rear electronics enclosure 203, such that the motor and seal plate assembly hold a main electronics unit 407, such as a main printed circuit board, within the rear electronics enclosure. Thus, one end of the drive motor and seal plate assembly 409 may be in contact with the rear electronics enclosure 203, and the other end of the drive motor and seal plate assembly 409 may be connected to a chassis side bracket 411. As shown in FIG. 4(*a*), the automated robot further comprises front electronics unit 408 provided within a front electronics enclosure 203. In some embodiments, the front electronics unit may be a front, printed circuit board 408. In various embodiments, the front electronics unit 408 and the main electronics unit 407 may be present within the same electronics enclosure or in different electronics enclosures.

FIG. 4(*a*) also shows that the automated robot may comprise a pump motor 402 enclosed within the pump motor enclosure 106. A pump volute enclosure may be provided comprising a pump volute top case 403 and a pump volute bottom case 404, wherein that the top case 403 and the bottom case 404 can be at least partially separated to place a pump impeller within the pump volute enclosure. The robot may further comprise a side bracket 411 on each side of the electronics enclosures 203.

Thus, in some embodiments, the main vehicle body 101 comprises at least one electronics enclosure 203. The electronics enclosure may be positioned parallel to the vacuum nozzle 104. The electronics enclosure houses a main circuit board 407 and at least one drive motor and seal-plate assembly 409. A drive motor and seal-plate assembly 409 may be positioned on each end of the electronics enclosure and help to hold the main electronics unit within the electronics enclosure 203 while sealing the electronics enclosure from surrounding fluid.

In some embodiments, additional electronics enclosures may be provided. One such additional electronics enclosure may comprise a front electronics unit 408, such as a front printed circuit board, and a front enclosure seal-plate assembly 410 to seal the compartment from surrounding fluid. The front electronics enclosure, seal-plate assembly may be present on each end of the electronics enclosure and helps to hold the front electronics unit 408 within the front electronics enclosure 203.

The robot may further comprises chassis side brackets 411 positioned on each side of the electronics enclosures 203 such that the drive motor and seal-plate assembly 409 and front electronics enclosure seal-plate assembly 410 form a compact assembly with the chassis side brackets 411.

The vacuum unit may comprise the vacuum nozzle 104 with an attached vacuum nozzle squeegee 413 and a vacuum nozzle end cap 415 on each side of the vacuum nozzle 104. The end cap helps in keeping the vacuum nozzle sealed to maintain the vacuum within the automated robot while in use. The vacuum nozzle squeegee 413 may be attached to the bottom of the vacuum nozzle 104 and assists in collecting settled biomass and/or unwanted debris.

The robot may further comprise a power communication port 414. The power communication port may function as a primary connection point for power and communications, such as for cables.

FIG. 4(*b*) illustrates that the robot may comprise the pump volute base and top case 102, hose 103, vacuum nozzle 104, tracks 105, pump motor enclosure 106, wheels 107, chassis plate 202, main body enclosure 206, pump 402, main body electronics enclosure 406, chassis side plates 411, vacuum nozzle squeegee 413, power communication input 414, vacuum nozzle end cap 415, and pump brace 416.

FIG. 4(*b*) illustrates that the pump motor enclosure 106 may comprise a pump brace 416 which connects the pump volute enclosure 102 to the pump motor enclosure 106.

Figure 5A:
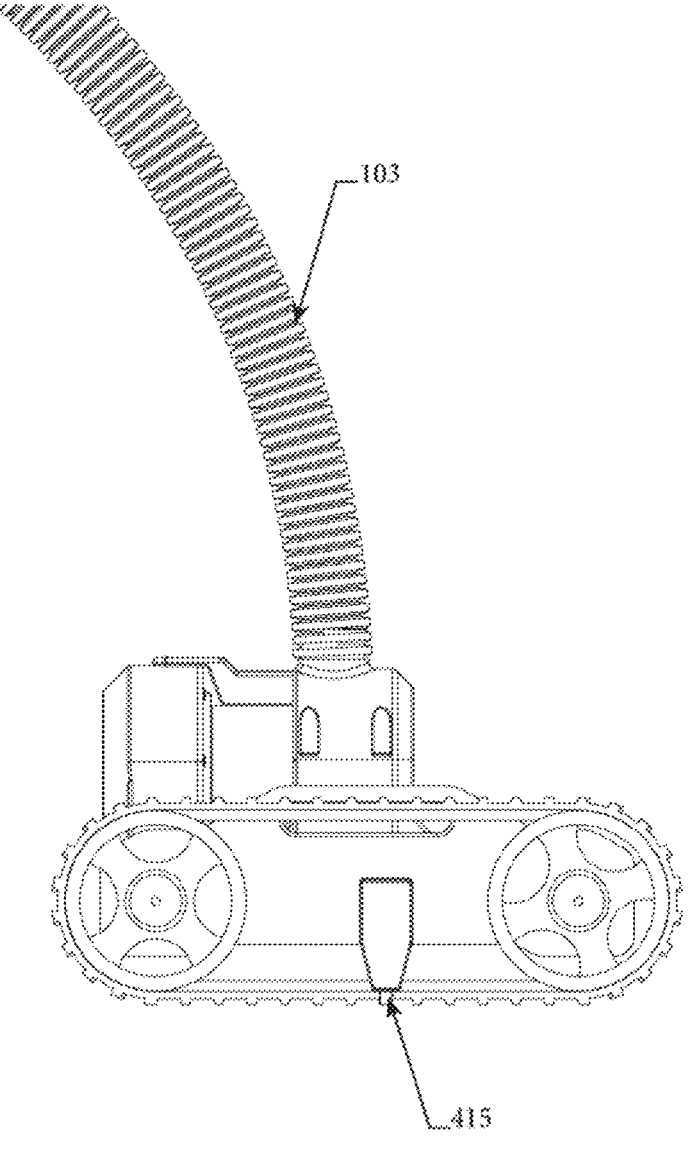
FIGS. 5(*a*) illustrates a left side view of the robot of FIG. 1.
Figure 5B:
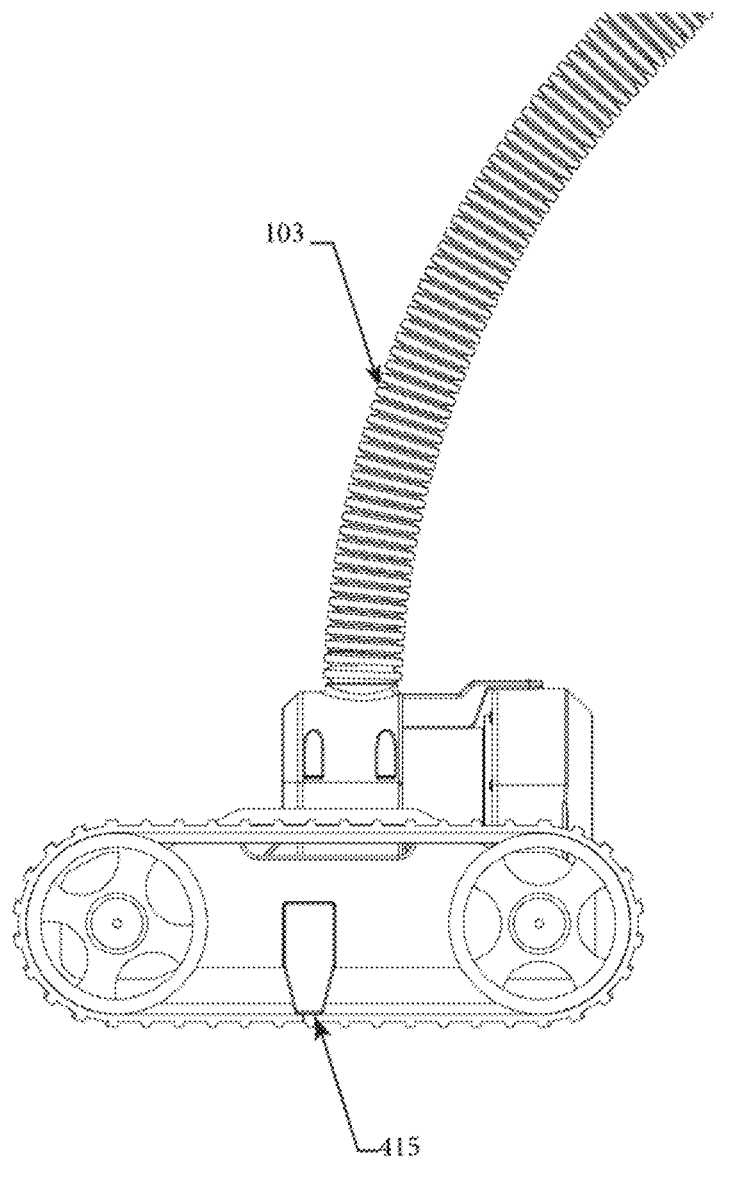

FIGS. 5(*a*) and 5(*b*) illustrate side views of an automated robot from the left side 501 and the right side 502, respectively. As shown, the hose may be flexible. In various embodiments, the hose may be made of rubber, plastic, or other known or commercially available material. The hose may be a spiral tube which may be compressed and released. The hose 103 may be connected to the pump volute enclosure 106.

Figure 6:
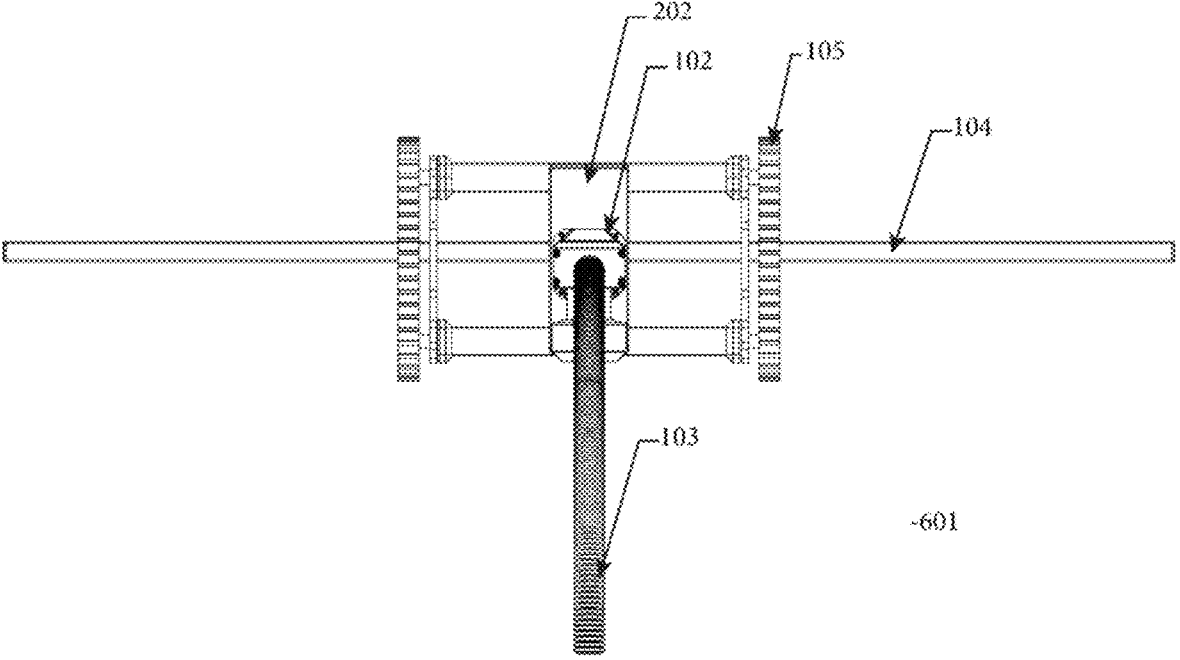
FIG. 6 illustrates a top view of the robot of FIG. 1.

FIG. 6 illustrates a top view of a multi-functional automated robot 100, showing a vacuum nozzle 104 running perpendicular to the chassis center plate 202 with the flexible hose 103 attached to the pump volute enclosure 102. As shown in the top view, the continuous track 105 of the wheel unit may be perpendicular to the vacuum nozzle 104.

Figure 7:
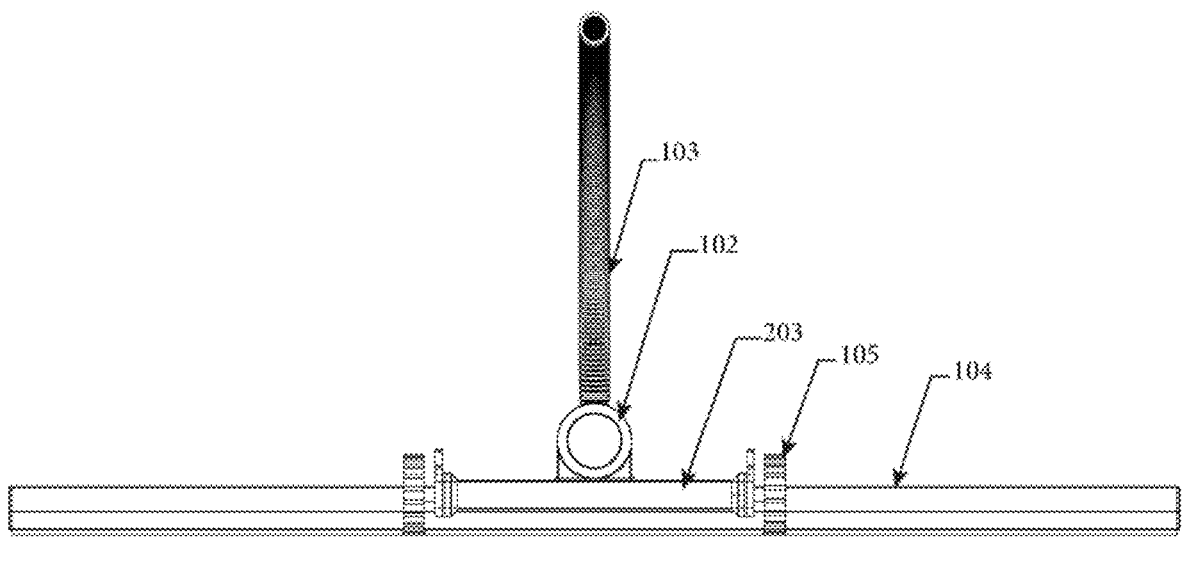
FIG. 7 illustrates a rear view of the robot of FIG. 1.

FIG. 7 illustrates a rear view of a multi-functional automated robot 100.

In other embodiments, the robot may convey other substances to and from the body of water, including, but not limited to, growth nutrients, chemicals for pH control, antimicrobial chemicals to sanitize or sterilize the robot, biological inoculum to start new cultures, substances to induce algae flocculation, as well as gasses, whether in the gas phase or already dissolved in a liquid solution, for example, carbon dioxide and oxygen to support microbial growth, or other gasses to sanitize and sterilize the robot and bioreactor, including ethylene oxide, ozone, mixed oxides of nitrogen, and chlorine dioxide.

In some embodiments, the robot is connected to, or is equipped with, solar panels to power the robot's movement and functions. The solar panels may be mounted onboard the robot body or mounted elsewhere and may transmit electrical power via a wired connection.

The robot may further comprise at least one fixed or rotating brush, or a pair of brushes, mounted to the main vehicle body such that it is fixed, rotates, translates, vibrates, or oscillates while the robot is in use, in accordance with some embodiments. The brush may be mounted externally to the outside of the main vehicle body in a manner. The brushes may be used to dislodge debris (such as algae, microbial biofilms, or other unwanted debris) from interior surfaces of a photobioreactor. In various other embodiments, the brushes may be replaced with other tools useful for cleaning the interior surface of the reactor, such as a squeegee or spray-nozzles that produce impinging water jets or additional vacuum attachments for substance removal.

Various mechanisms may be used to assist in navigation of the robot.

In some embodiments, the robot further comprises a radio frequency identification (RFID) tag, allowing the robot to be identified and communicate with at least one RFID-tag reader so that the tag data can be captured automatically and managed remotely, assisting the automated robotic system navigation through known tag locations. The tag data may include, for example, location coordinates of the tag. In general, the tag data can be used to help navigate the robot by providing a specific location for the robot to initiate a task, to provide a checkpoint so the robot does not get lost, and the like. In various embodiments, the electro-magnetic guide wire sensor may be a radiofrequency identification (RFID) reader. The robotic system may comprise a plurality of electro-magnetic guide wire sensors and/or RFID readers for detecting the robot's position and sensing the presence or absence of other objects within or near the area of interest so the robot may maneuver around the objects, dislodge and collect the objects, or perform various actions upon, or in response to, the objects that are located within or near an area of interest.

In some embodiments, sonar emitters may be positioned in known locations within the aquatic system to aid in the navigation of the robot. In various embodiments, the robotic system implements at least one acoustic sensor with signal conditioning circuitry wherein the sensor detects the acoustic energy from sonar emitters to assist the automated robotic system to geolocate and navigate.

In various embodiments, the navigational functions of the robot may be assisted by interaction with a satellite-based global positioning system (GPS) or another method of navigational telemetry, such as the use of navigational reference points or beacons. Such beacons may be erected from the land, or under water, or underground, suspended from the air (as with a balloon) or affixed to another permanent structure or temporary structure. The navigational reference point may be affixed to a movable object such as a land vehicle, water vehicle, or air vehicle. The robot may geolocate directly with the navigational system through a GPS floating receiver or similar, or it may interact with intermediary nodes using sonar communication or similar.

FIG. 8(a) illustrates a containment structure 801, in accordance with one embodiment. The containment structure provides structural support to a growth chamber housed within the containment structure according to one embodiment. FIG. 8(b) illustrates a side view of the containment structure.

As shown in FIGS. 8(a) and 8(b), the containment structure 801 may comprise of plurality of structural members assembled to form a frame. In the embodiment shown, the frame has 3-D, geometric shape. Specifically, the frame is a triangular prism. In other embodiments, an alternate 3-D geometric shape may be used. A containment mesh may be secured to the 3-D frame to provide additional support. For example, a containment mesh may be secured to the inside of the frame.

One manner of forming the frame is to first assemble a plurality of structural members into 2-dimensional, geometric shapes, herein referred to as structural ribs, and then to join an array of the structural ribs using additional structural members, or cross-beams, attached generally perpendicularly. In the embodiment shown, structural members are assembled to form 2-D, structural ribs in a triangular geometry, referred to otherwise as A-frames. By connecting a plurality of A-frames, spaced at regular intervals, with a plurality of cross-beams, the 3-D geometric shape formed is that of triangular prism. FIG. 8(a) illustrates the cross beams attached perpendicularly to the A-frames, forming a lattice along the surface of the frame that is intended to transmit structural stresses in at least two dimensions. When the A-frames and cross-beams are oriented perpendicularly, a rectangular lattice results. Alternatively, if the included angle between the A-frames is smaller or larger than 90°, a diagonal lattice is made. A containment mesh may be secured to the frame, such as to the underside of the frame, to further dissipate structural stress along the surface of the containment structure. In the embodiment shown in FIG. 8(a), the containment mesh is in the form of a rectangular lattice. In alternative embodiments, a diagonal lattice may be used for the containment mesh. In various other embodiments, a periodic array of other, interconnected, 2-D geometrical shapes may be used to form a lattice of containment mesh.

A control panel 802 and a plurality of valves 803 may be provided and may be connected to inlet and outlet plumbing 804 to control the transfer of fluid to and from the robotic system. In the embodiment shown, the control panel 802 and the valves 803 may are provided outside of the support structure.

Figure 9:
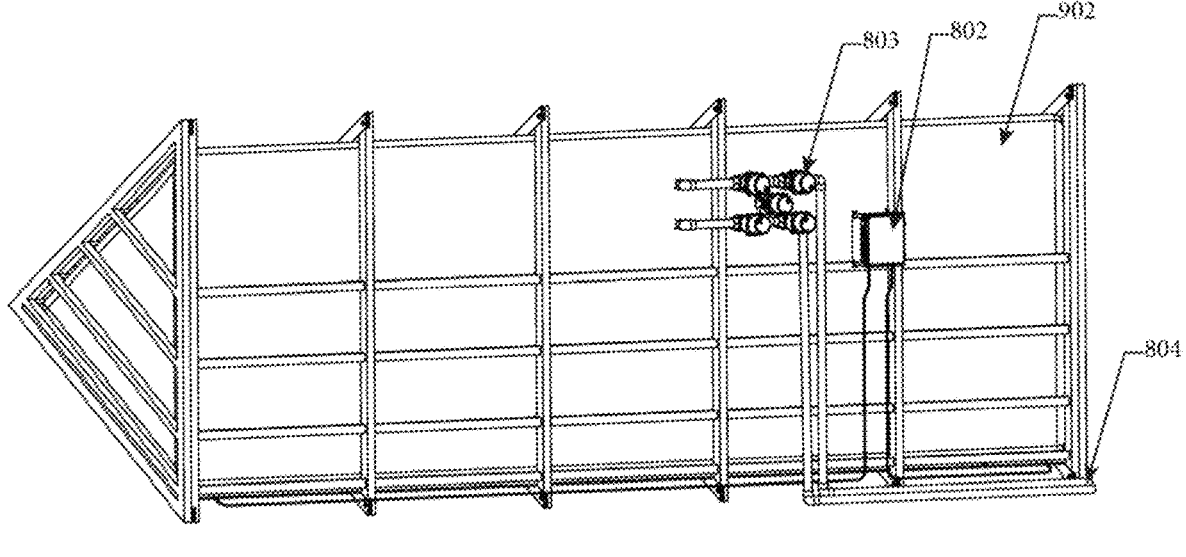
FIG. 9 illustrates a perspective view of a containment structure, but omitting a containment mesh , in accordance with one embodiment FIG. 10(*a*) illustrates a perspective view of a growth chamber sitting on top of as support base, in accordance with one embodiment.

FIG. 9 illustrates a containment structure 801 with the containment mesh omitted to reveal the frame 902, in accordance with one embodiment.

Figure 10A:
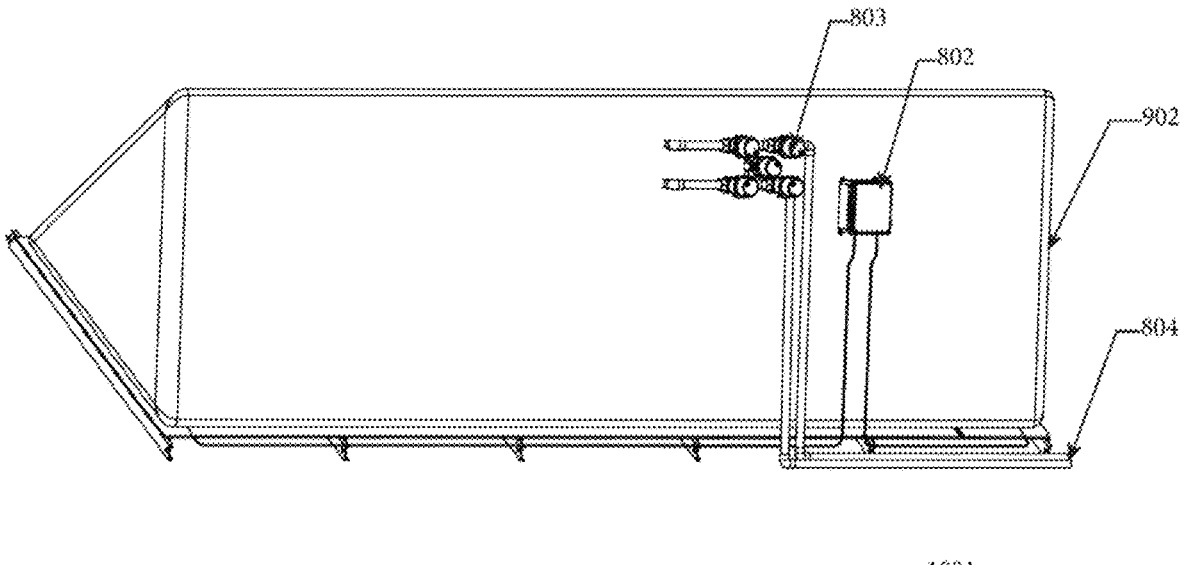
FIG. 10(*b*) illustrates a cut-away of a growth chamber, showing a robot residing within a containment chamber, in accordance with one embodiment.

FIG. 10(a) illustrates a side view of a growth chamber 902 of the containment structure. The growth chamber may be provided within the containment structure on a base and may be flexible to conform to the shape of the containment structure. The growth chamber may contribute to optimal large-scale production of microbial biomass by allowing the transmission of external photons, for sustaining phototrophic microorganisms, while simultaneously preventing the influx of debris and unwanted microbial organisms into the culture. In many embodiments, the growth chamber may also be referred to as a photo bio-reactor. While the term growth chamber is specifically used, it is to be appreciated that the growth chamber may be any suitable containment chamber and may not be specifically configured for assisting with growth.

Figure 10B:
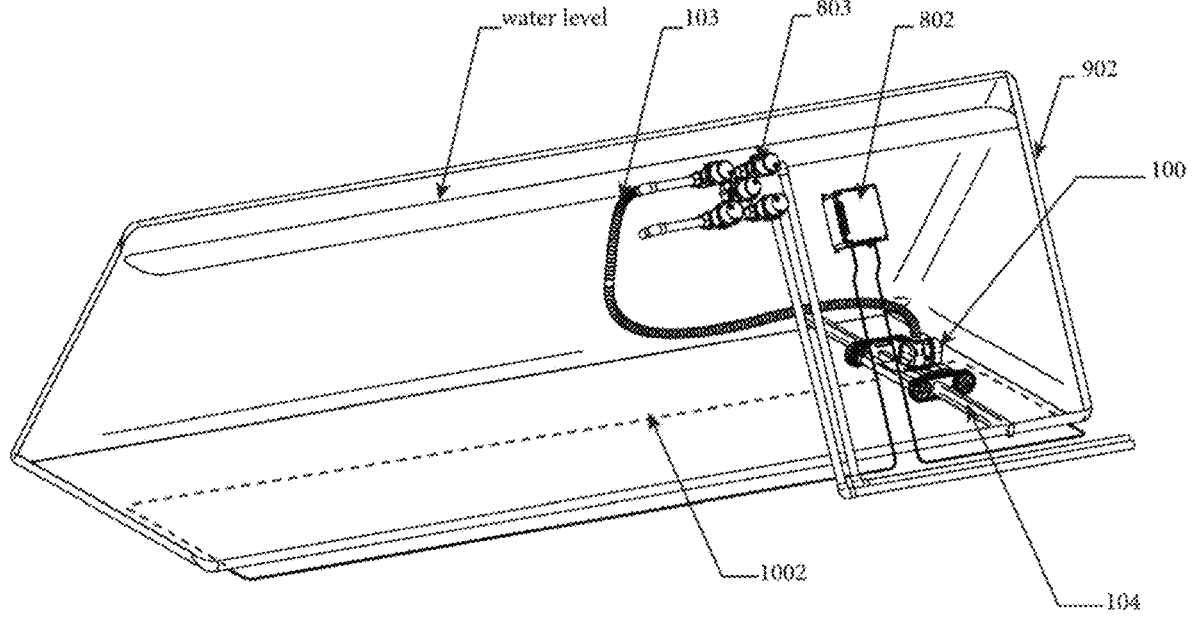

FIG. 10(b) illustrates a cut-away of the growth chamber 902, to reveal a robot 100 within the growth chamber. This figure further shows that the growth chamber 902 may connect to the robot 100 via the flexible hose 103. The hose 103 may extend from the robot 100 and connect it to one or more valves 803. An electro-magnetic guide wire can set a path, represented by dotted lines 1002, along which the robot may travel. The robot 100 may be positioned at any location within the growth chamber 902 such that the robot fits within the growth chamber 902 and can move within the growth chamber, such as on the path 1002, or may remain stationed at a single location. The hose may be of varying lengths.

In various embodiments, the robotic system further comprises an electro-magnetic guide wire, wherein the electro-magnetic guide wire may be laid over a surface, underneath a surface, or embedded below a surface, such as the floor of a water body or an aquatic system, therein providing a guided pathway for the robot to follow when navigating. The electro-magnetic guide wire may be laid in a defined pattern as to allow the robot to follow a custom path in a custom shaped aquatic system or fluid environment.

In various embodiments, the robot moves in a direction along the electro-magnetic guide wire, with cells, particles, debris, waste or other material collected and ejected through the hose. The automated robot may be controlled or operated via remote instruction using a wired or wireless communication link. The robot may be configured to report various status and location conditions or other collected data back to the controller. Furthermore, the robot may be operated using artificial intelligence wherein the navigation of the robot is assisted by the tools of artificial intelligence through various sensor data, e.g. from a camera, a light sensor, thermometer, or chemical sensing probe. Thus, the robot may operate and function within a water body using the electro-magnetic guide wire or without the electro-magnetic guide wire by using other control variations.

In various embodiments, a waveform generator produces current through the electro-magnetic guide wire at a particular frequency (5 kHz to 500 kHz) and amplitude to produce an electro-magnetic field (EMF) along the desired path of the robot, with the ability to tune and optimize signal frequency and amplitude for system conditions.

In various other embodiments, the robotic system implements at least one electro-magnetic guide wire sensor with signal conditioning circuitry wherein the sensor detects the electro-magnetic field emitted by the guide wire allowing the robot to locate the guide wire and navigate along a specified path. As further shown in Figure the growth chamber may be partially or fully filled with fluid. In the embodiment shown, the growth chamber is only partially filled with fluid, as indicated by the water level. The automatic robot 100 is provided within the growth chamber 902, such that the vacuum nozzle 104 is in close proximity with the floor of the growth chamber 902. In other embodiments, one or more vacuum nozzles may be placed in close proximity to the sidewalls of the growth chamber.

Figure 11:
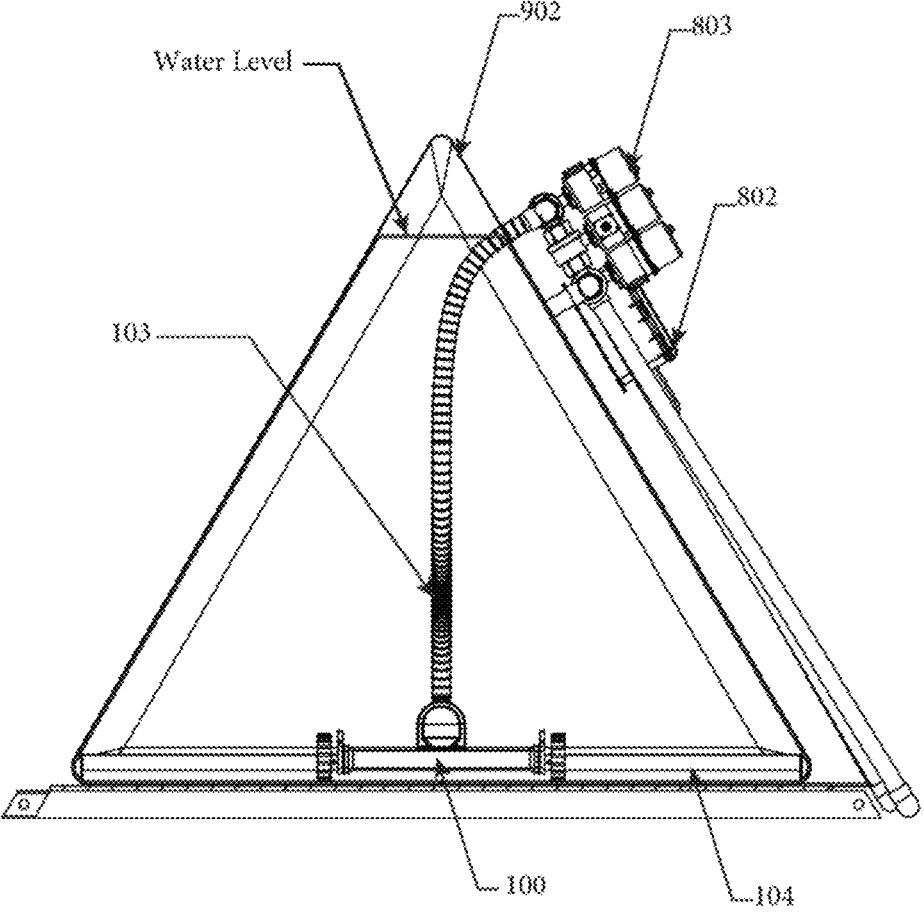
FIG. 11 illustrates a front cross-section of a growth chamber and its bottom containment structure, showing the presence of an automated robot within the flexible chamber, in accordance with one embodiment.

FIG. 11 illustrates a front cross-section of a growth chamber and its bottom containment structure, in accordance with one embodiment.

As shown in FIG. 11, the robot 100 may be located within the growth chamber 902. The robot may be connected the growth chamber via the hose 103. The hose extends from the robot, passes through the growth chamber 902, and connects to the plurality of valves 803, which are controlled by the control panel 802. FIG. 11 further illustrates that the vacuum nozzle 104 extends on either side of the main vehicle body 101 and fits into the grooves or open spaces at the base of the geometrical shaped framed structure. The robot, together with a growth chamber, such as a photo-bioreactor, contributes to optimal large-scale production of photosynthetic microorganisms. The vacuum nozzle of the robot may be used to collect biomass from the growth chamber and transfer it across the wall of the growth chamber via the robot pump 102 and hose 103.

Figure 12:
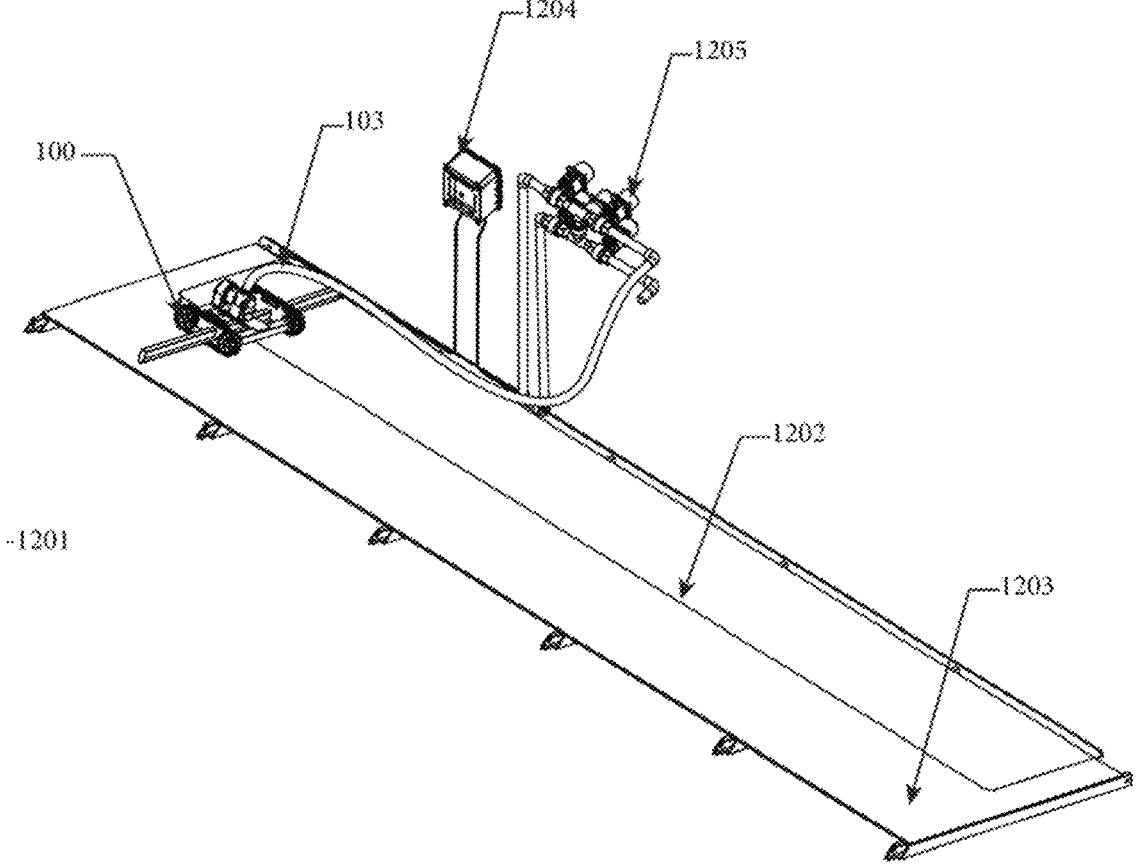
FIG. 12 illustrates a perspective view of an automated robot sitting on top of a support base, in accordance with one embodiment.

FIG. 12 illustrates an example embodiment of a robot being used for collecting biomass or debris from the bottom surface of a growth chamber 1203, with navigation of the robot being directed by the electromagnetic guide wire 1202.

The robot 100 may be positioned on the electromagnetic guided wire pathway 1202 laid on a surface 1203, such as a floor of an open or enclosed water body with fluid suspension. The wire may be spread to cover an area of interest. The robot can be aligned with the electromagnetic guide wire, either manually by a human operator or by a self-alignment procedure performed by the robot, such that the vehicle body is centered directly above the electro-magnetic guide wire. The hose 103 connects to one or more valves 803 positioned outside or within the body of water in order to collect and deliver fluid from and to the body of water. The robot may be connected via a power cord to the control panel 802 to monitor and control the robot while in use. One or more electromagnetic sensors may be installed within the electronics enclosure, whereby the sensors help define the robot's movement with respect to the electro-magnetic guide wire.

Figure 13A:
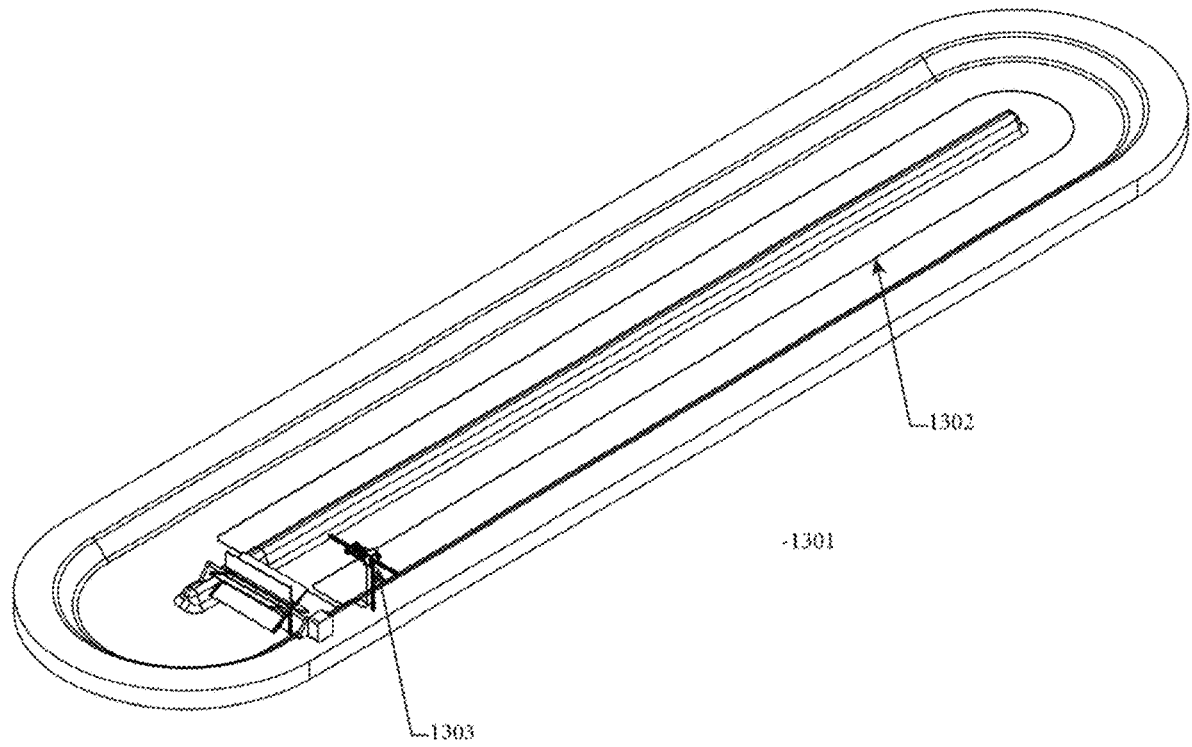
FIG. 13(*a*) illustrates a perspective view of an automated robot in an open water body, in accordance with one embodiment.
Figure 13B:
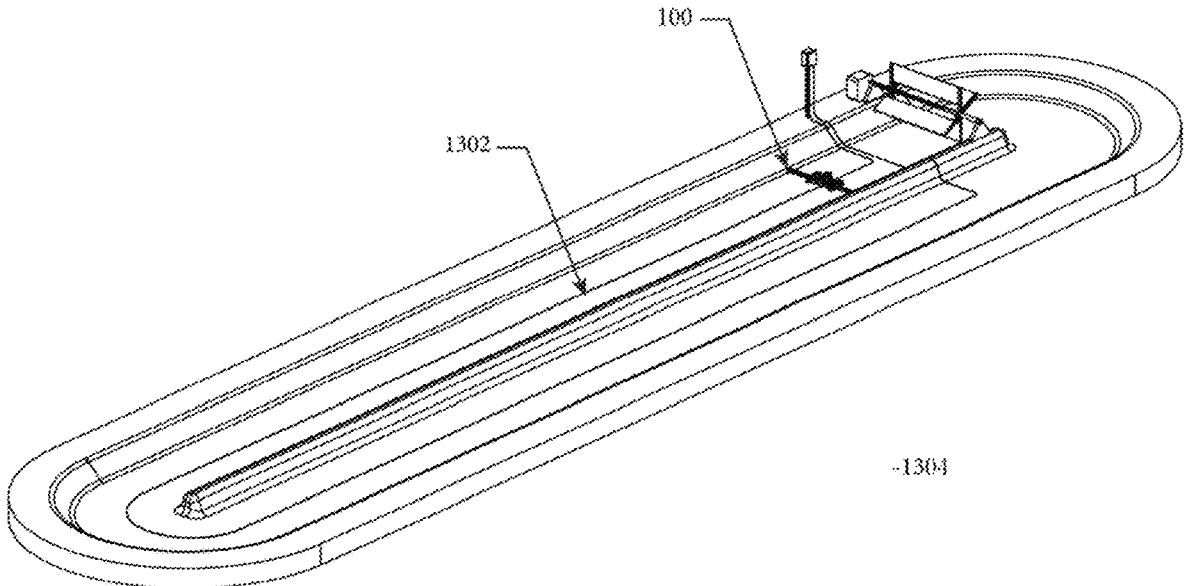

In an alternate embodiment, the robot may be used within an open body of water, such as an algae raceway pond. FIGS. 13(a) and 13(b) illustrate different views of the robot 100 while in use within an open race-way pond 1300.

As shown in FIG. 13(a), an electromagnetic guide wire 1302 maybe laid over a surface, such as the bottom of a water body e.g. an open raceway pond, in a defined pattern to cover an area of interest. The robot can be aligned with the electromagnetic guide wire, either manually by a human operator or by a self-alignment procedure performed by the robot, such that the vehicle body is centered directly above the electro-magnetic guide wire. The wire may be laid in a pattern such as to ensure that the robot covers an entire area of interest. The robot 100 is placed on the electro-magnetic guide wire 1302 such that the robot is positioned perpendicularly to the electro-magnetic guide wire. Once the robot is turned ON, the robot may move along the path defined by the guide wire pattern and cover the entire area of interest. The robot, while moving within the water body, such as an open raceway pond, as shown in the FIGS. 13(a) and 13(b), can perform functions such as cleaning the pond by picking waste or debris through vacuum nozzle via vacuum generated by the pump and transferring them through the hose into a collection tank or some other area of interest within the water body. The electro-magnetic guide wire 1302 may be connected to a control box 1303 placed in close proximity to the water body, whereby the robot can be controlled manually or remotely during its use.

Figure 14:
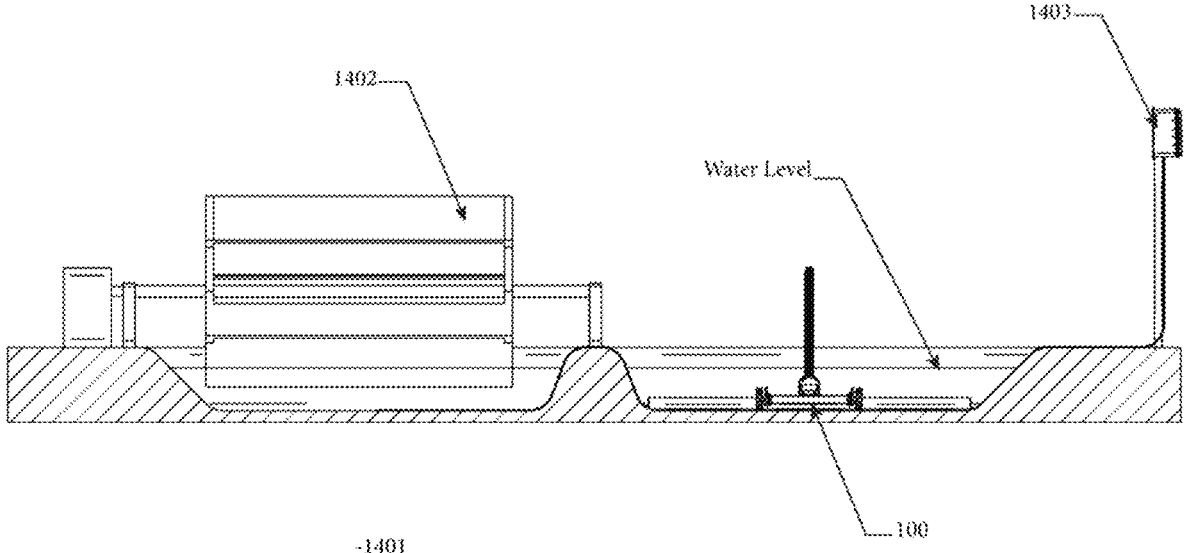
FIG. 14 illustrates a side, cross-section of an automated robot in an open water body, in accordance with one embodiment.

FIG. 14 provides a cross-section of an robot 100 submerged within an open water body, such as a race-way pond 1300, in accordance with one embodiment. A paddle wheel 1402 within the open raceway pond provides continuous fluid circulation. The robot may be immersed either fully or partially within the water body. In FIG. 14, the robot is immersed fully, with the main vehicle body being below the water level and the hose is above the water level. In many embodiments, a control panel 1403 may be positioned outside of the water body such that the robot may be operated either manually or remotely.

Figure 15:
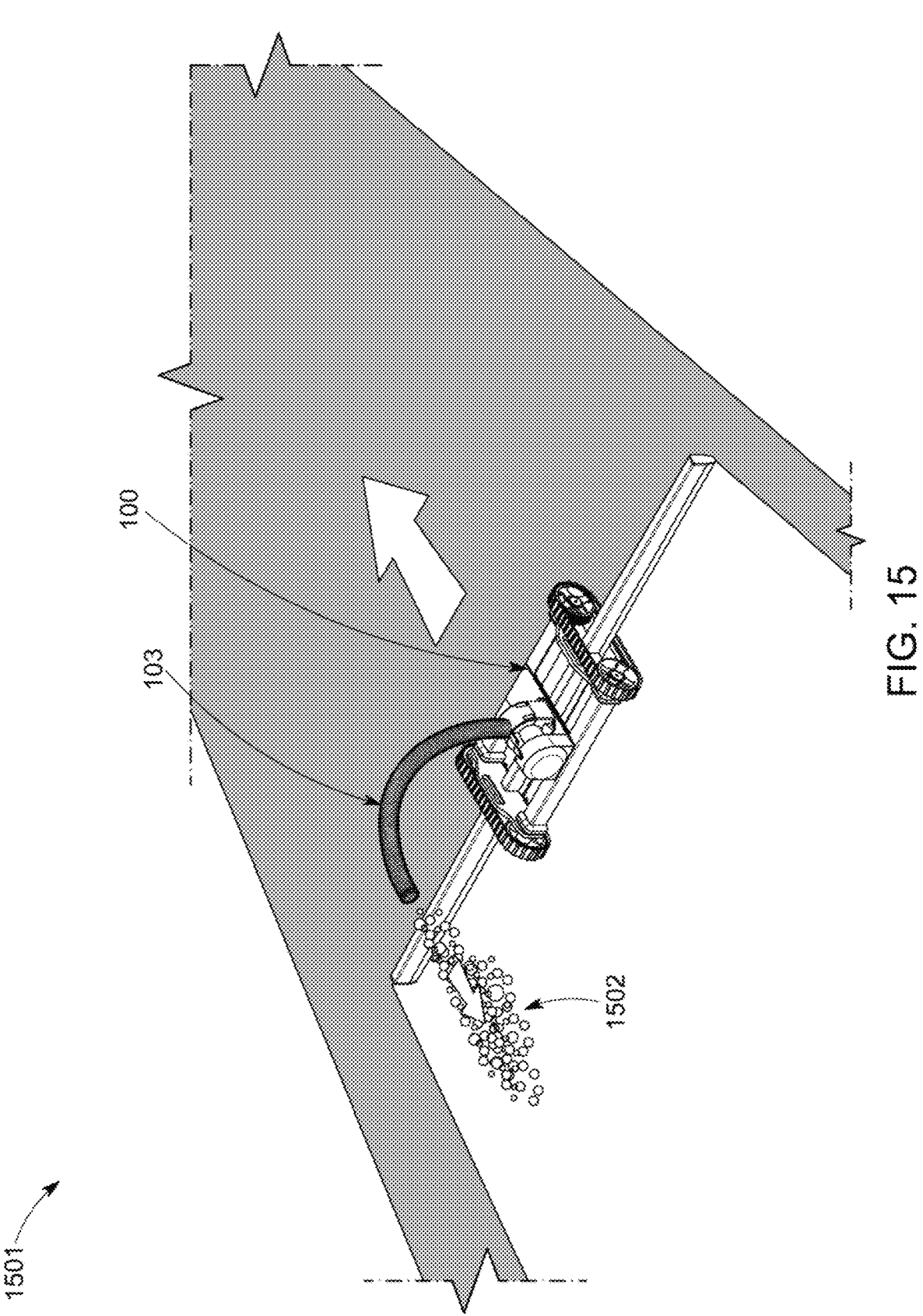
FIG. 15 illustrates a perspective view of an automated robot collecting biomass or debris, in accordance with one embodiment.

FIG. 15 illustrates an example embodiment of an robot 100 for collecting settled biomass or debris 1501. The figure shows an example use of collecting settled biomass or other suspended material by the robot, wherein the vacuum nozzle connected to the main vehicle body of the robot is collecting the suspended material 1502 from a water body and transferring the material to another location, e.g. a collection tank, via the pump and flexible hose 103. A collection tank may be attached as a further extension of the robot such that one end of the hose is connected to the robot and the other end opens into the collection tank. When the robot is used for cleaning water bodies, the robot may be either immersed fully within the water body such that the water level covers all the components of the robot 100 or partially submerged, so long as the depth of fluid is sufficient to prime the pump and initiate suction through the vacuum nozzle. Once the robot is placed within the water body, the robot may remain there for an extended period of time to collect debris or clean any water body or a defined area of interest.

The robotic system may use machine learning technology to train the autonomous robotic vacuum cleaner to detect waste, debris, particulate matter, and/or other material in a fluid environment. To such end, the robotic system, for example, the robot, may include a camera to view the area. The robot can be configured to scan the fluid system for waste, debris, particulate matter, and/or other material in the fluid environment and then focus cleaning on those areas.

Machine learning is a form of artificial intelligence (AI) that teaches computers to learn and improve upon past experiences. It works by exploring data and identifying patterns. A processor associated with the robotic system may be programmed with an initial data-defined pattern or set of rules and that pattern is automated with machine learning. The robot may be configured for supervised learning or unsupervised learning. In a supervised learning embodiment, the robot is presented with a training set.

In various embodiments, the robot may also function as an automated cleaner for the fluid environment that is contained within open or closed water bodies or vessels, wherein the robot travels through the fluid environment or along a nearby surface, following the electro-magnetic guide wire or other navigational instructions, to dislodge, transport and/or collect debris and waste from open or closed water bodies.

In various other embodiments, the robot may also remove waste, debris, and other material, be it suspended in the fluid, settled to the bottom, or adhering to a nearby surface. The hose attached to the main vehicle body of the robot is capable of collecting and transporting waste, debris or material from water bodies by means of a fluid force that originates within the robot body or is generated outside of the robot, using fluid transport equipment like a vacuum, pump, eductor, or blower and is transmitted to or from the robot via a hose, pipe, tubing, or any combination thereof. Once inside the robotic system, said waste or debris may be stored onboard for a time and discharged later, or they may be discharged immediately from within the robotic system or discharged outside the robotic system.

In various embodiments, the robotic system may convey fluids from within a fluid environment or aquatic system. Conveyance of the fluid present within the robotic system, which may or may not contain said objects or debris, may be further assisted by the action of an onboard pump or an externally located pump that circulates fluid from the outside of the robotic system to the inside and then out again or circulates fluid in a loop that is contained entirely within the robotic system.

The disclosed robot may further be connected to other devices or apparatus for managing the surrounding fluid environment within an open or closed water body. Such devices may offer assistance for growing target microbes, collecting biomass, cleaning microbial biofilm or other contaminating substances, collecting waste, objects, and material from within the bulk fluid or from the surface, bottom, or sidewalls of the water bodies, and otherwise managing various parameters and/or quality of the water bodies.

Unless defined otherwise, all technical and scientific terms used herein have the same meaning as commonly understood by one of ordinary skill in the art.

All publications mentioned herein are incorporated by reference to disclose and describe the methods and/or materials in connection with which the publications are cited. The citation of any publication is not an admission that the publication is prior art.

While specific embodiments of, and examples for, the process and compositions are described above for illustrative purposes, various equivalent modifications are possible within the scope of the system, as those skilled in the relevant art will recognize.

Directional terms such as "on", "over", "top", "bottom", are used with reference to the orientation of the Figure(s) being described. Because components of embodiments of the present invention can be positioned in a number of different orientations, the directional terminology is used for purposes of illustration only and is in no way limiting. Throughout the present application, words such as "cover", "base", "front", "back", "top", "upper", and "lower" are used in a relative sense only.

As used herein and in the appended claims, the singular forms "a", "an", and "the" include plural referents unless the context clearly dictates otherwise.

When two or more items (for example, elements or processes) are referenced by an alternative "or", this indicates that either could be present separately or any combination of them could be present together except where the presence of one necessarily excludes the other or others.

In the foregoing description various embodiments of the present disclosure have been presented for the purpose of illustration and description. They are not intended to be exhaustive or to limit the invention to the precise form disclosed. Obvious modifications or variations are possible in light of the above teachings. The various embodiments were chosen and described to provide the best illustration of the principals of the disclosure and their practical application, and to enable one of ordinary skill in the art to utilize the various embodiments with various modifications as are suited to the particular use contemplated. All such modifications and variations are within the scope of the present disclosure as determined by the appended claims when interpreted in accordance with the breadth they are fairly, legally, and equitably entitled.

What is claimed is:

1. A robotic system for use within a fluid environment, the robotic system comprising:
   a robot, the robot comprising a robot main body and at least one pair of wheels, the pair of wheels being housed within a continuous track;
   an elongated vacuum nozzle protruding from the robot main body;
   an electromagnetic guide wire forming a guide path configured for the robot to follow within the fluid environment;
   a control panel for monitoring and controlling functioning of the fluid environment, wherein the control panel enables a user to interface with the robot for controlling functions of the robot within the fluid environment;
   wherein the robot is configured to collect biomass, from within the fluid environment using the vacuum nozzle; and
   wherein the robotic system is configured to harvest a first volume of biomass from a first location within the fluid environment using the vacuum nozzle, and deliver, as a second volume of biomass is collected using the vacuum nozzle, a concentrated stream of the first volume of biomass to a second location within or outside the fluid environment.

2. The robotic system of claim 1, wherein the robot comprises two pairs of wheels, with the first pair of wheels being provided on a first side of the robot main body and the second pair of wheels being provided on a second side of the robot main body, each pair of wheels being housed within a continuous track.

3. The robotic system of claim 1, wherein the robot further comprises:
   at least one pump connected to the vacuum nozzle for generating fluid momentum; and
   a hose, wherein the hose is attached to the pump and is configured to transfer the collected biomass or particulate material from the fluid environment to another location, either within or outside the fluid environment, for collection.

4. The robotic system of claim 1, wherein the electromagnetic guide wire is placed to cover an area of interest within the growth chamber fluid environment, the placement of electromagnetic guide wire forming the guide path.

5. The robotic system of claim 1, wherein electrical current passing through the electromagnetic guide wire oscillates in a periodic waveform and generates a corresponding magnetic field.

6. The robotic system of claim 5, wherein the robotic system further comprises at least one electromagnetic guide wire sensor present onboard the robot main body, wherein the electromagnetic guide wire sensor detects the magnetic field generated by the electromagnetic guide wire.

7. The robotic system of claim 1, wherein the fluid environment includes one or more emitters positioned at known locations, and wherein the robotic system includes one or more sensors with signal conditioning circuitry wherein the sensor detects energy from the emitters to assist the robotic system to navigate and respond to the fluid environment.

8. The robotic system of claim 1, wherein the robotic system comprises more than one robot connected in a communication network within the growth chamber fluid environment or within multiple growth chamber fluid environments.

9. The robotic system of claim 1, wherein the robot is further configured to collect information, wherein the information is at least one of pH, temperature, pressure, shear stress, viscosity, fluid velocity, local light intensity, concentration of various chemicals and suspended particles ionic strength, and visual images of the fluid within the fluid environment.

10. The robotic system of claim 1, wherein the fluid environment is a closed water body or an open water body.

11. The robotic system of claim 1, wherein robotic system is further configured to disperse the collected second volume of biomass within the fluid environment.

12. The robotic system of claim 1, further comprising an accessory for performing functions to manage the fluid environment to produce microalgae or microbial species, wherein the accessory comprises at least one of a spray nozzle, a brush, a squeegee, a probe, and a blower configured to transfer gas into the fluid environment.

13. The robotic system of claim 1, wherein the vacuum nozzle extends through at least a portion of the length of the main body, and wherein the vacuum nozzle includes a squeegee.

14. The robotic system of claim 1, wherein the main body includes two opposing sides, and wherein the vacuum nozzle protrudes from both sides of the main body.

15. The robotic system of claim 14, wherein the vacuum nozzle comprises a tube arranged perpendicular to the continuous track.

16. The robotic system of claim 1, wherein the fluid environment includes a base having a width, and wherein the vacuum nozzle extends substantially the width of the base.

17. The robotic system of claim 1, wherein robot system is configured to dispense one or more of chemicals, nutrients, and dissolved gasses.

18. The robotic system of claim 1, wherein monitoring and controlling functioning of the fluid environment comprises monitoring and controlling temperature or pH; mixing or dispensing of chemicals, nutrients, or dissolved gasses; or operation of the pump.

19. A robotic system for use within a fluid environment including a concentration of biomass on or adjacent a bottom surface, the robotic system comprising:

a robot, the robot comprising a robot main body and at least one pair of wheels, the pair of wheels being housed within a continuous track;

a vacuum nozzle protruding from each side of the robot main body and arranged perpendicular to the continuous track;

at least one pump within or carried by the robot main body connected to the vacuum nozzle for generating fluid momentum;

a hose attached to the pump;

an electromagnetic guide wire forming a guide path configured for the robot to follow within the fluid environment;

a control panel for monitoring and controlling functioning of the growth chamber fluid environment, wherein the control panel enables a user to interface with the robot for controlling functions of the robot within the fluid environment;

wherein the robot is configured to harvest a first volume of biomass from a first location within the fluid environment using the vacuum nozzle, and deliver via the pump and hose, as a second volume of biomass is collected using the vacuum nozzle, a concentrated stream of the first volume of biomass to a second location within or outside the fluid environment, wherein the second location is discrete from the robot.

20. The robotic system of claim 19, and further comprising a squeegee arranged within and extending at least a portion of the length of the vacuum nozzle.

* * * * *